United States Patent
Gan et al.

(10) Patent No.: US 12,457,598 B2
(45) Date of Patent: Oct. 28, 2025

(54) DATA TRANSMISSION METHOD, DATA TRANSMISSION APPARATUS AND NON-TRANSITORY COMPUTER-READABLE STORAGE MEDIUM FOR TID-TO-LINK MAPPING

(71) Applicant: HUAWEI TECHNOLOGIES CO., LTD., Guangdong (CN)

(72) Inventors: Ming Gan, Shenzhen (CN); Guogang Huang, Shenzhen (CN); Dandan Liang, Shenzhen (CN); Jian Yu, Shenzhen (CN); Yunbo Li, Shenzhen (CN); Yuchen Guo, Shenzhen (CN); Mengshi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 17/946,924

(22) Filed: Sep. 16, 2022

(65) Prior Publication Data
US 2023/0013454 A1    Jan. 19, 2023

Related U.S. Application Data

(63) Continuation of application No. PCT/CN2021/080836, filed on Mar. 15, 2021.

(30) Foreign Application Priority Data

Mar. 16, 2020 (CN) .......................... 202010183125.8

(51) Int. Cl.
*H04W 72/12* (2023.01)
*H04W 28/02* (2009.01)

(52) U.S. Cl.
CPC ....... *H04W 72/12* (2013.01); *H04W 28/0278* (2013.01)

(58) Field of Classification Search
CPC . H04W 72/12; H04W 28/0278; H04W 28/18; H04W 72/21; H04W 76/15;
(Continued)

(56) References Cited

U.S. PATENT DOCUMENTS

| 2019/0246312 A1 | 8/2019 | Kim et al. |
| 2020/0029350 A1 | 1/2020 | Asterjadhi et al. |

FOREIGN PATENT DOCUMENTS

| CN | 107771401 A | 3/2018 |
| CN | 110199494 A | 9/2019 |

(Continued)

OTHER PUBLICATIONS

Vivo, "Remaining issues on BSR and UAI for NR Sidelink mode 1," 3GPP TSG-RAN WG2 Meeting #106, R2-1905839, Reno, USA, May 13-17, 2019, 4 pages.
(Continued)

*Primary Examiner* — Ayanah S George
(74) *Attorney, Agent, or Firm* — Fish & Richardson P.C.

(57) ABSTRACT

This application provides data transmission methods and apparatuses, to introduce a buffer status report (BSR) mechanism through multi-link (ML) cooperation, to improve performance of scheduling a station by an ML device. In an example method, a multi-link transmit end determines BSR signaling sent to a multi-link receive end, where the BSR signaling can enable the multi-link receive end to schedule a station of the multi-link transmit end over one or more links. Further, the multi-link transmit end sends the B SR signaling to the multi-link transmit end over the one or more links. This introduces a BSR mechanism through ML cooperation.

18 Claims, 6 Drawing Sheets

(58) Field of Classification Search
CPC .... H04W 84/12; H04W 28/02; H04L 5/0091; H04L 5/0053; Y02D 30/70
See application file for complete search history.

(56) References Cited

FOREIGN PATENT DOCUMENTS

| | | | |
|---|---|---|---|
| CN | 110418404 A | 11/2019 | |
| CN | 110830175 A | 2/2020 | |
| CN | 110876165 A | 3/2020 | |
| CN | 113411831 B | 12/2023 | |
| EP | 4462947 A2 | 11/2024 | |
| WO | WO-2021183045 A1 * | 9/2021 | ............ H04W 76/14 |

OTHER PUBLICATIONS

Nayarasi, "CWAP—802.11 : Block Ack," Nov. 1, 2014, retrieved from URL: <https://mmcciew.com/2014/11/01/cwap-802-11-block-ack>, 11 pages.
IEEE Std 802.Nov. 2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.
IEEE P802.11ax /D1.0, "Draft Standard for Information technology—Telecommunications and information exchange between systems Local and metropolitan area networks—Specific requirements; Part 11: Wireless LAN Medium Access Control(MAC) and Physical Layer (PHY) Specifications; Amendment 6: Enhancements for High Efficiency WLAN," Nov. 2016, 453 pages.
Office Action in Chinese Appln. No. 202010183125.8, dated Apr. 14, 2023, 7 pages.
Office Action in Indian Appln. No. 202237055187, dated Feb. 14, 2023, 6 pages (with English translation).
International Search Report and Written Opinion in International Appln. No. PCT/CN2021/080836, mailed on May 28, 2021, 11 pages (with partial English translation).
Jang et al., "Indication of Multi-link Information," IEEE 802.11-20/0028r0, Jan. 13, 2020, 13 pages.
Patil et al., "Multi-TID ML BA Negotiation Scheme," IEEE 802.11-20/0914r0, Jun. 16, 2020, 18 pages.
Seok et al., "Proposed Draft Text for MLO TID-to-Link Mapping," IEEE 802.11-21/0019r4, Mar. 4, 2021, 11 pages.
Extended European Search Report in European Appln No. 21771321.3, dated Jul. 18, 2023, 11 pages.
EP Communication Pursuant to Article 94(3) EPC in European Appln. No. 21771321.3, mailed on Apr. 1, 2025, 8 pages.

* cited by examiner

| B0 B3 | B4 B5 | B6 B7 | B8 B9 | B10 B17 | B18 B25 |
|---|---|---|---|---|---|
| ACI bitmap | TID difference | ACI high | Scaling factor | Queue size high | Queue size all |

| 10 bits | 2 bits | 3 bits | 9 bits | 2 bits |
|---|---|---|---|---|
| Queue size all of a transmission link | Scaling factor of the transmission link | TID | Queue size | Scaling factor |

(a)

| 3 bits | 9 bits | 3 bits | 9 bits | 2 bits |
|---|---|---|---|---|
| TID #1 | Queue #1 size | TID #2 | Queue #2 size | Scaling factor |

(b)

| 3 bits | 8 bits | 2 bits | 3 bits | 9 bits | 1 bits |
|---|---|---|---|---|---|
| TID #1 | Queue #1 size | Scaling factor | TID #2 | Queue #2 size | Scaling factor difference |

| B0 B3 | B4 | B5 B6 | B7 | B8 B9 | B10 B15 |
|---|---|---|---|---|---|
| TID | EOSP | ACK policy | A-MSDU present | Scaling factor | Queue size |

FIG. 9

| A-MSDU support | Block acknowledgment policy | Service type TID | Buffer size |
|---|---|---|---|
| 1 bits | 2 bits | 3 bits | 10 bits |

FIG. 10

DATA TRANSMISSION METHOD, DATA TRANSMISSION APPARATUS AND NON-TRANSITORY COMPUTER-READABLE STORAGE MEDIUM FOR TID-TO-LINK MAPPING

CROSS-REFERENCE TO RELATED APPLICATIONS

This application is a continuation of International Application No. PCT/CN2021/080836, filed on Mar. 15, 2021, which claims priority to Chinese Patent Application No. 202010183125.8, filed on Mar. 16, 2020. The disclosures of the aforementioned applications are hereby incorporated by reference in their entireties.

TECHNICAL FIELD

This application relates to the field of wireless communication technologies, and more specifically, to a data transmission method and an apparatus.

BACKGROUND

Data traffic rapidly grows with development of the mobile Internet and popularization of smart terminals. A wireless local area network (wireless local area network, WLAN) technology with advantages of a high rate and low costs has become one of mainstream mobile broadband access technologies.

To greatly improve a service transmission rate of a WLAN system, the institute of electrical and electronics engineers (institute of electrical and electronics engineers, IEEE) 802.11ax standard further uses an orthogonal frequency division multiple access (orthogonal frequency division multiple access, OFDMA) technology based on an existing orthogonal frequency division multiplexing (orthogonal frequency division multiplexing, OFDM) technology. The OFDMA technology supports simultaneous data sending and receiving by multiple nodes. In the IEEE 802.11ax standard, a buffer status report (buffer status report, BSR) mechanism may be used for assisting an access point (access point, AP) in uplink OFDMA scheduling.

An operating frequency band range of an IEEE 802.11ax-compliant device is expanded from 2.4 GHz and 5 GHz to 2.4 GHz, 5 GHz, and 6 GHz. Due to an increasingly high user requirement for quality of service of communication, it is difficult for the IEEE 802.11ax standard to meet user requirements in terms of a large throughput, low jitter, a low latency, and the like. Therefore, a next-generation IEEE technology, for example, the IEEE 802.11be standard, urgently needs to be developed. The IEEE 802.11be standard is referred to as an extremely high throughput (extremely high throughput, EHT) standard. An IEEE 802.11be-compliant device may reduce a service transmission delay through multi-link (multi-link, ML) cooperation.

However, how to introduce the BSR mechanism to improve performance of scheduling a station by an ML device through ML cooperation becomes an urgent problem to be resolved.

SUMMARY

This application provides a data transmission method and an apparatus, to introduce a BSR mechanism through ML cooperation, to improve performance of scheduling a station by an ML device.

According to a first aspect, a data transmission method is provided. The data transmission method may be performed by a multi-link transmit end, or may be performed by a chip or a circuit disposed in the multi-link transmit end. This is not limited in this application.

The multi-link transmit end may be a multi-link station (station, STA), a multi-link AP, or another multi-link device.

The data transmission method includes:

The multi-link transmit end determines buffer status report BSR signaling, where the BSR signaling is used by a multi-link receive end for scheduling a station of the multi-link transmit end over one or more links. The multi-link transmit end sends the BSR signaling to the multi-link receive end over the one or more links.

According to the data transmission method provided in this embodiment of this application, the multi-link transmit end sends the BSR signaling to the multi-link receive end, so that the multi-link receive end can schedule the station of the multi-link transmit end over the one or more links based on the BSR signaling. This improves, based on a BSR mechanism, performance of scheduling a station by an ML device through multi-link cooperation.

With reference to the first aspect, in some implementations of the first aspect, the method further includes: The multi-link transmit end sends a request message to the multi-link receive end. The multi-link transmit end receives a response message from the multi-link receive end. The request message and the response message are used for negotiating to set up a traffic identifier-to-link TID-to-link mapping relationship.

Further, according to the data transmission method provided in this embodiment of this application, before sending the BSR signaling to the multi-link receive end, the multi-link transmit end may further obtain the TID-to-link mapping relationship by negotiating with the multi-link receive end. Service buffer sizes on different links can be determined based on the TID-to-link mapping relationship, so that the multi-link transmit end can more accurately determine, based on the TID-to-link mapping relationship, the BSR signaling that needs to be sent.

With reference to the first aspect, in some implementations of the first aspect, the BSR signaling includes one or more of a queue size all field of a transmission link, a scaling factor field of the transmission link, a TID field, a queue size field, and a first scaling factor field.

The queue size all field of the transmission link indicates a size of a first buffered service on a link for sending the BSR signaling, the scaling factor field of the transmission link indicates a unit of the size of the first buffered service, the TID field indicates a reported first service type, the queue size field indicates a size of a second buffered service corresponding to the first service type, and the first scaling factor field indicates a unit of the size of the second buffered service.

The transmission link indicates a link for transmitting the BSR signaling. To be specific, if a format of the BSR signaling includes the queue size all field of the transmission link, the scaling factor field of the transmission link, the TID field, the queue size field, and the field indicating the unit of the size of the second buffered service, after receiving the BSR signaling, the multi-link receive end can schedule the station of the multi-link transmit end on the transmission link based on the BSR signaling.

With reference to the first aspect, in some implementations of the first aspect, the BSR signaling includes one or more of a first TID field, a first queue size field, a second TID field, a second queue size field, and a second scaling factor field.

The first TID field indicates a reported second service type, the first queue size field indicates a size of a third buffered service corresponding to the second service type, the second TID field indicates a reported third service type, the second queue size field indicates a size of a fourth buffered service corresponding to the third service type, and the second scaling factor field indicates a unit of the size of the third buffered service and a unit of the size of the fourth buffered service.

If the format of the BSR signaling includes the first TID field, the first queue size field, the second TID field, the second queue size field, and the second scaling factor field, after receiving the BSR signaling, the multi-link receive end can schedule the station of the multi-link transmit end on a link corresponding to a first TID and a link corresponding to a second TID based on the BSR signaling.

With reference to the first aspect, in some implementations of the first aspect, the BSR signaling includes one or more of a third TID field, a third queue size field, a third scaling factor field, a fourth TID field, a fourth queue size field, and a scaling factor difference field.

The third TID field indicates a reported fourth service type, the third queue size field indicates a size of a fifth buffered service corresponding to the fourth service type, the fourth TID field indicates a reported fifth service type, the fourth queue size field indicates a size of a sixth buffered service corresponding to the fifth service type, the third scaling factor field indicates a unit of the size of the fifth buffered service, and the third scaling factor field and the scaling factor difference field indicate a unit of the size of the sixth buffered service.

If the BSR signaling format includes the third TID field, the third queue size field, the third scaling factor field, the fourth TID field, the fourth queue size field, and the scaling factor difference field, after receiving the BSR signaling, the multi-link receive end can schedule the station of the multi-link transmit end on a link corresponding to a third TID and a link corresponding to a fourth TID based on the BSR signaling.

With reference to the first aspect, in some implementations of the first aspect, the request message and/or the response message include/includes control information and mapping information, the control information is used for determining to set up the mapping relationship, and the mapping information indicates the mapping relationship.

The request message and the response message used for negotiating to set up the TID-to-link mapping relationship include the control information and the mapping information, so that the multi-link transmit end and the multi-link receive end can successfully set up the TID-to-link mapping relationship based on the request message and the response message.

With reference to the first aspect, in some implementations of the first aspect, a value of the control information includes at least one of the following: 0, 1, 2, 3, 4, 5, or 6. When the value of the control information included in the request message is 0, it indicates that the transmit end requests to set up the mapping relationship. When the value of the control information included in the request message is 1, it indicates that the transmit end requests to set up the mapping relationship and provide a suggested mapping relationship. When the value of the control information included in the request message is 2, it indicates that the transmit end requests to set up the mapping relationship and provide a required mapping relationship. When the value of the control information included in the response message is 3, it indicates that the receive end accepts a request that is for setting up the mapping relationship and that is sent by the transmit end. When the value of the control information included in the response message is 4, it indicates that a mapping relationship suggested by the receive end is different from a mapping relationship suggested or required by the transmit end. When the value of the control information included in the response message is 5, it indicates that a mapping relationship required by the receive end is different from a mapping relationship suggested or required by the transmit end. When the value of the control information included in the response message is 6, it indicates that the receive end rejects the request that is for setting up the mapping relationship and that is sent by the transmit end.

The control information may be 1-bit information, so that signaling overheads can be reduced.

With reference to the first aspect, in some implementations of the first aspect, the mapping information includes N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps. The multi-link transmit end and the multi-link receive end determine the TID-to-link mapping relationship based on the N link identifier bitmaps.

With reference to the first aspect, in some implementations of the first aspect, the mapping information includes a control field and N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps and the control field. The multi-link transmit end and the multi-link receive end determine the TID-to-link mapping relationship based on the N link identifier bitmaps and the control field.

With reference to the first aspect, in some implementations of the first aspect, the request message includes a request management frame, and the response message includes a response management frame. Alternatively, the request message includes an ADDBA request frame, and the response message includes an ADDBA response frame.

According to the data transmission method provided in this embodiment of this application, the request message and the response message used for negotiating to set up the TID-to-link mapping relationship may reuse signaling in an existing procedure, to reduce signaling overheads.

With reference to the first aspect, in some implementations of the first aspect, before the multi-link transmit end sends the BSR signaling to the multi-link receive end over the one or more links, the method further includes: The multi-link transmit end receives trigger information from the multi-link receive end, where the trigger information is used for triggering the multi-link transmit end to send the BSR signaling over the one or more links.

According to the data transmission method provided in this embodiment of this application, the multi-link transmit end may passively determine, based on the trigger information of the multi-link receive end, to send the BSR signaling to the multi-link receive end, to provide an initiative for the multi-link receive end.

With reference to the first aspect, in some implementations of the first aspect, that the multi-link transmit end sends the BSR signaling to the multi-link receive end over the one or more links includes:

The multi-link transmit end sends a quality of service QoS data packet to the multi-link receive end, where a media access control MAC header of the QoS data packet carries the BSR signaling.

According to the data transmission method provided in this embodiment of this application, the multi-link transmit end may include the BSR signaling in the MAC header of the QoS data packet to send the BSR signaling to the multi-link receive end, to provide a simple manner of sending the BSR signaling.

With reference to the first aspect, in some implementations of the first aspect, a QoS control field of the QoS data packet further includes buffer status indication information, and the buffer status indication information indicates a size of a buffered service of the multi-link transmit end.

The QoS data packet carrying the BSR signaling may further carry buffer status indication information that indicates the size of the buffered service of the transmit end, so that the multi-link receive end learns the size of the service locally buffered by the multi-link transmit end.

With reference to the first aspect, in some implementations of the first aspect, the buffer status indication information includes one bit of a TID field in the QoS control field and eight bits of a queue size field in the QoS control field.

The buffer status indication information may be implemented by reusing a field in an existing QoS data packet, to reduce signaling overheads.

According to a second aspect, another data transmission method is provided. The data transmission method may be performed by a multi-link receive end, or may be performed by a chip or a circuit disposed in the multi-link receive end. This is not limited in this application.

The second device may be a multi-link STA, a multi-link AP, or another multi-link device.

The data transmission method includes:

The multi-link receive end receives buffer status report BSR signaling from a multi-link transmit end over one or more links.

The multi-link receive end schedules a station of the multi-link transmit end over the one or more links based on the BSR signaling.

According to the data transmission method provided in this embodiment of this application, the multi-link transmit end sends the BSR signaling to the multi-link receive end, so that the multi-link receive end can schedule the station of the multi-link transmit end over the one or more links based on the BSR signaling. This improves, based on a BSR mechanism, performance of scheduling a station by an ML device through multi-link cooperation.

With reference to the second aspect, in some implementations of the second aspect, the method further includes: The multi-link receive end receives a request message from the multi-link transmit end. The multi-link receive end sends a response message to the multi-link transmit end. The request message and the response message are used for negotiating to set up a traffic identifier-to-link TID-to-link mapping relationship.

Further, according to the data transmission method provided in this embodiment of this application, before sending the BSR signaling to the multi-link receive end, the multi-link transmit end may further obtain the TID-to-link mapping relationship by negotiating with the multi-link receive end. Service buffer sizes on different links can be determined based on the TID-to-link mapping relationship, so that the multi-link transmit end can more accurately determine, based on the TID-to-link mapping relationship, the BSR signaling that needs to be sent.

With reference to the second aspect, in some implementations of the second aspect, the BSR signaling includes one or more of a queue size all field of a transmission link, a scaling factor field of the transmission link, a TID field, a queue size field, and a first scaling factor field.

The queue size all field of the transmission link indicates a size of a first buffered service on a link for sending the BSR signaling, the scaling factor field of the transmission link indicates a unit of the size of the first buffered service, the TID field indicates a reported first service type, the queue size field indicates a size of a second buffered service corresponding to the first service type, and the first scaling factor field indicates a unit of the size of the second buffered service.

The transmission link indicates a link for transmitting the BSR signaling. To be specific, if a format of the BSR signaling includes the queue size all field of the transmission link, the scaling factor field of the transmission link, the TID field, the queue size field, and the field indicating the unit of the size of the second buffered service, after receiving the BSR signaling, the multi-link receive end can schedule the station of the multi-link transmit end on the transmission link based on the BSR signaling.

With reference to the second aspect, in some implementations of the second aspect, the BSR signaling includes one or more of a first TID field, a first queue size field, a second TID field, a second queue size field, and a second scaling factor field.

The first TID field indicates a reported second service type, the first queue size field indicates a size of a third buffered service corresponding to the second service type, the second TID field indicates a reported third service type, the second queue size field indicates a size of a fourth buffered service corresponding to the third service type, and the second scaling factor field indicates a unit of the size of the third buffered service and a unit of the size of the fourth buffered service.

If the format of the BSR signaling includes the first TID field, the first queue size field, the second TID field, the second queue size field, and the second scaling factor field, after receiving the BSR signaling, the multi-link receive end can schedule the station of the multi-link transmit end on a link corresponding to a first TID and a link corresponding to a second TID based on the BSR signaling.

With reference to the second aspect, in some implementations of the second aspect, the BSR signaling includes one or more of a third TID field, a third queue size field, a third scaling factor field, a fourth TID field, a fourth queue size field, and a scaling factor difference field.

The third TID field indicates a reported fourth service type, the third queue size field indicates a size of a fifth buffered service corresponding to the fourth service type, the fourth TID field indicates a reported fifth service type, the fourth queue size field indicates a size of a sixth buffered service corresponding to the fifth service type, the third scaling factor field indicates a unit of the size of the fifth buffered service, and the third scaling factor field and the scaling factor difference field indicate a unit of the size of the sixth buffered service.

If the BSR signaling format includes the third TID field, the third queue size field, the third scaling factor field, the fourth TID field, the fourth queue size field, and the scaling factor difference field, after receiving the BSR signaling, the multi-link receive end can schedule the station of the multi-link transmit end on a link corresponding to a third TID and a link corresponding to a fourth TID based on the BSR signaling.

With reference to the second aspect, in some implementations of the second aspect, the request message and/or the response message include/includes control information and mapping information, the control information is used for determining to set up the mapping relationship, and the mapping information indicates the mapping relationship.

The request message and the response message used for negotiating to set up the TID-to-link mapping relationship include the control information and the mapping information, so that the multi-link transmit end and the multi-link receive end can successfully set up the TID-to-link mapping relationship based on the request message and the response message.

With reference to the first aspect, in some implementations of the first aspect, a value of the control information includes at least one of the following: 0, 1, 2, 3, 4, 5, or 6. When the value of the control information included in the request message is 0, it indicates that the transmit end requests to set up the mapping relationship. When the value of the control information included in the request message is 1, it indicates that the transmit end requests to set up the mapping relationship and provide a suggested mapping relationship. When the value of the control information included in the request message is 2, it indicates that the transmit end requests to set up the mapping relationship and provide a demanded mapping relationship. When the value of the control information included in the response message is 3, it indicates that the receive end accepts a request that is for setting up the mapping relationship and that is sent by the transmit end. When the value of the control information included in the response message is 4, it indicates that a mapping relationship suggested by the receive end is different from a mapping relationship suggested or demanded by the transmit end. When the value of the control information included in the response message is 5, it indicates that a mapping relationship demanded by the receive end is different from a mapping relationship suggested or demanded by the transmit end. When the value of the control information included in the response message is 6, it indicates that the receive end rejects the request that is for setting up the mapping relationship and that is sent by the transmit end.

The control information may be 1-bit information, so that signaling overheads can be reduced.

With reference to the second aspect, in some implementations of the second aspect, the mapping information includes N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps. The multi-link transmit end and the multi-link receive end determine the TID-to-link mapping relationship based on the N link identifier bitmaps.

With reference to the second aspect, in some implementations of the second aspect, the mapping information includes a control field and N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps and the control field. The multi-link transmit end and the multi-link receive end determine the TID-to-link mapping relationship based on the N link identifier bitmaps and the control field.

With reference to the second aspect, in some implementations of the second aspect, the request message includes a request management frame, and the response message includes a response management frame. Alternatively, the request message includes an ADDBA request frame, and the response message includes an ADDBA response frame.

According to the data transmission method provided in this embodiment of this application, the request message and the response message used for negotiating to set up the TID-to-link mapping relationship may reuse signaling in an existing procedure, to reduce signaling overheads.

With reference to the second aspect, in some implementations of the second aspect, before the multi-link receive end receives the BSR signaling from the multi-link transmit end over the one or more links, the method further includes:

The multi-link receive end sends trigger information to the multi-link transmit end, where the trigger information is used for triggering the multi-link transmit end to send the BSR signaling over the one or more links.

According to the data transmission method provided in this embodiment of this application, the multi-link transmit end may passively determine, based on the trigger information of the multi-link receive end, to send the BSR signaling to the multi-link receive end, to provide an initiative for the multi-link receive end.

With reference to the second aspect, in some implementations of the second aspect, that the multi-link receive end receives BSR signaling from a multi-link transmit end over one or more links includes:

The multi-link receive end receives a quality of service QoS data packet from the multi-link transmit end over the one or more links, where a media access control MAC header of the QoS data packet carries the BSR signaling.

According to the data transmission method provided in this embodiment of this application, the multi-link transmit end may include the BSR signaling in the MAC header of the QoS data packet to send the BSR signaling to the multi-link receive end, to provide a simple manner of sending the BSR signaling.

With reference to the second aspect, in some implementations of the second aspect, a QoS control field of the QoS data packet further includes buffer status indication information, and the buffer status indication information indicates a size of a buffered service of the multi-link transmit end.

The QoS data packet carrying the BSR signaling may further carry buffer status indication information that indicates the size of the buffered service of the transmit end, so that the multi-link receive end learns the size of the service locally buffered by the multi-link transmit end.

With reference to the second aspect, in some implementations of the second aspect, the buffer status indication information includes one bit of a TID field in the QoS control field and eight bits of a queue size field in the QoS control field.

The buffer status indication information may be implemented by reusing a field in an existing QoS data packet, to reduce signaling overheads.

According to a third aspect, a data transmission method is provided. The data transmission method may be performed by a multi-link transmit end, or may be performed by a chip or a circuit disposed in the multi-link transmit end. This is not limited in this application.

The multi-link transmit end may be a multi-link STA, a multi-link AP, or another multi-link device.

The data transmission method includes:

The multi-link transmit end sends a request message to a multi-link receive end.

The multi-link transmit end receives a response message from the multi-link receive end.

The request message and the response message are used for negotiating to set up a traffic identifier-to-link TID-to-link mapping relationship.

According to the data transmission method provided in this embodiment of this application, before sending BSR signaling to the multi-link receive end, the multi-link transmit end may further obtain the TID-to-link mapping relationship by negotiating with the multi-link receive end. Service buffer sizes on different links can be determined based on the TID-to-link mapping relationship, so that the multi-link transmit end can more accurately determine, based on the TID-to-link mapping relationship, the BSR signaling that needs to be sent.

With reference to the third aspect, in some implementations of the third aspect, the method further includes: The multi-link transmit end determines buffer status report BSR signaling, where the BSR signaling indicates the multi-link receive end to schedule a station of the multi-link transmit end over one or more links. The multi-link transmit end sends the BSR signaling to the multi-link receive end over the one or more links.

According to the data transmission method provided in this embodiment of this application, the multi-link transmit end sends the BSR signaling to the multi-link receive end, so that the multi-link receive end can schedule the station of the multi-link transmit end over the one or more links based on the BSR signaling. This improves, based on a BSR mechanism, performance of scheduling a station by an ML device through multi-link cooperation.

Specifically, a format of the BSR signaling in the third aspect is the same as the format of the BSR signaling in the first aspect. Details are not described herein again.

With reference to the third aspect, in some implementations of the third aspect, the request message and/or the response message include/includes control information and mapping information, the control information is used for determining to set up the mapping relationship, and the mapping information indicates the mapping relationship.

The request message and the response message used for negotiating to set up the TID-to-link mapping relationship include the control information and the mapping information, so that the multi-link transmit end and the multi-link receive end can successfully set up the TID-to-link mapping relationship based on the request message and the response message.

With reference to the third aspect, in some implementations of the third aspect, the mapping information includes N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps. The multi-link transmit end and the multi-link receive end determine the TID-to-link mapping relationship based on the N link identifier bitmaps.

With reference to the third aspect, in some implementations of the third aspect, the mapping information includes a control field and N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps and the control field. The multi-link transmit end and the multi-link receive end determine the TID-to-link mapping relationship based on the N link identifier bitmaps and the control field.

With reference to the third aspect, in some implementations of the third aspect, the request message includes a request management frame, and the response message includes a response management frame. Alternatively, the request message includes an ADDBA request frame, and the response message includes an ADDBA response frame.

According to the data transmission method provided in this embodiment of this application, the request message and the response message used for negotiating to set up the TID-to-link mapping relationship may reuse signaling in an existing procedure, to reduce signaling overheads.

With reference to the third aspect, in some implementations of the third aspect, before the multi-link transmit end sends the BSR signaling to the multi-link receive end over the one or more links, the method further includes: The multi-link transmit end receives trigger information from the multi-link receive end, where the trigger information is used for triggering the multi-link transmit end to send the BSR signaling over the one or more links.

According to the data transmission method provided in this embodiment of this application, the multi-link transmit end may passively determine, based on the trigger information of the multi-link receive end, to send the BSR signaling to the multi-link receive end, to provide an initiative for the multi-link receive end.

With reference to the third aspect, in some implementations of the third aspect, that the multi-link transmit end sends the BSR signaling to the multi-link receive end over the one or more links includes:

The multi-link transmit end sends a quality of service QoS data packet to the multi-link receive end, where a media access control MAC header of the QoS data packet carries the BSR signaling.

According to the data transmission method provided in this embodiment of this application, the multi-link transmit end may include the BSR signaling in the MAC header of the QoS data packet to send the BSR signaling to the multi-link receive end, to provide a simple manner of sending the BSR signaling.

With reference to the third aspect, in some implementations of the third aspect, a QoS control field of the QoS data packet further includes buffer status indication information, and the buffer status indication information indicates a size of a buffered service of the multi-link transmit end.

The QoS data packet carrying the BSR signaling may further carry buffer status indication information that indicates the size of the buffered service of the transmit end, so that the multi-link receive end learns the size of the service locally buffered by the multi-link transmit end.

With reference to the third aspect, in some implementations of the third aspect, the buffer status indication information includes one bit of a TID field in the QoS control field and eight bits of a queue size field in the QoS control field.

The buffer status indication information may be implemented by reusing a field in an existing QoS data packet, to reduce signaling overheads.

According to a fourth aspect, another data transmission method is provided. The data transmission method may be performed by a multi-link receive end, or may be performed by a chip or a circuit disposed in the multi-link receive end. This is not limited in this application.

The second device may be a multi-link STA, a multi-link AP, or another multi-link device.

The data transmission method includes:

The multi-link receive end receives a request message from a multi-link transmit end. The multi-link receive end sends a response message to the multi-link transmit end. The request message and the response message are used for negotiating to set up a traffic identifier-to-link TID-to-link mapping relationship.

According to the data transmission method provided in this embodiment of this application, before sending BSR signaling to the multi-link receive end, the multi-link transmit end may further obtain the TID-to-link mapping relationship by negotiating with the multi-link receive end. Service buffer sizes on different links can be determined based on the TID-to-link mapping relationship, so that the multi-link transmit end can more accurately determine, based on the TID-to-link mapping relationship, the BSR signaling that needs to be sent.

With reference to the fourth aspect, in some implementations of the fourth aspect, the method further includes: The multi-link receive end receives the buffer status report BSR signaling from the multi-link transmit end over one or more links.

The multi-link receive end schedules a station of the multi-link transmit end over the one or more links based on the BSR signaling.

Further, according to the data transmission method provided in this embodiment of this application, the multi-link transmit end sends the BSR signaling to the multi-link receive end, so that the multi-link receive end can schedule the station of the multi-link transmit end over the one or more links based on the BSR signaling. This improves, based on a BSR mechanism, performance of scheduling a station by an ML device through multi-link cooperation.

Specifically, a format of the BSR signaling in the fourth aspect is the same as the format of the BSR signaling in the second aspect. Details are not described herein again.

With reference to the fourth aspect, in some implementations of the fourth aspect, the request message and/or the response message include/includes control information and mapping information, the control information is used for determining to set up the mapping relationship, and the mapping information indicates the mapping relationship.

The request message and the response message used for negotiating to set up the TID-to-link mapping relationship include the control information and the mapping information, so that the multi-link transmit end and the multi-link receive end can successfully set up the TID-to-link mapping relationship based on the request message and the response message.

With reference to the fourth aspect, in some implementations of the fourth aspect, the mapping information includes N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps. The multi-link transmit end and the multi-link receive end determine the TID-to-link mapping relationship based on the N link identifier bitmaps.

With reference to the fourth aspect, in some implementations of the fourth aspect, the mapping information includes a control field and N link identifier bitmaps, and N is a positive integer.

According to the data transmission method provided in this embodiment of this application, the mapping information included in the request message and the response message used for negotiating to set up the TID-to-link mapping relationship may be the N link identifier bitmaps and the control field. The multi-link transmit end and the multi-link receive end determine the TID-to-link mapping relationship based on the N link identifier bitmaps and the control field.

With reference to the fourth aspect, in some implementations of the fourth aspect, the request message includes a request management frame, and the response message includes a response management frame. Alternatively, the request message includes an ADDBA request frame, and the response message includes an ADDBA response frame.

According to the data transmission method provided in this embodiment of this application, the request message and the response message used for negotiating to set up the TID-to-link mapping relationship may reuse signaling in an existing procedure, to reduce signaling overheads.

With reference to the fourth aspect, in some implementations of the fourth aspect, before the multi-link receive end receives the BSR signaling from the multi-link transmit end over the one or more links, the method further includes:

The multi-link receive end sends trigger information to the multi-link transmit end, where the trigger information is used for triggering the multi-link transmit end to send the BSR signaling over the one or more links.

According to the data transmission method provided in this embodiment of this application, the multi-link transmit end may passively determine, based on the trigger information of the multi-link receive end, to send the BSR signaling to the multi-link receive end, to provide an initiative for the multi-link receive end.

With reference to the fourth aspect, in some implementations of the fourth aspect, that the multi-link receive end receives BSR signaling from a multi-link transmit end over one or more links includes:

The multi-link receive end receives a quality of service QoS data packet from the multi-link transmit end over the one or more links, where a media access control MAC header of the QoS data packet carries the BSR signaling.

According to the data transmission method provided in this embodiment of this application, the multi-link transmit end may include the BSR signaling in the MAC header of the QoS data packet to send the BSR signaling to the multi-link receive end, to provide a simple manner of sending the BSR signaling.

With reference to the fourth aspect, in some implementations of the fourth aspect, a QoS control field of the QoS data packet further includes buffer status indication information, and the buffer status indication information indicates a size of a buffered service of the multi-link transmit end.

The QoS data packet carrying the BSR signaling may further carry buffer status indication information that indicates the size of the buffered service of the transmit end, so that the multi-link receive end learns the size of the service locally buffered by the multi-link transmit end.

With reference to the fourth aspect, in some implementations of the fourth aspect, the buffer status indication information includes one bit of a TID field in the QoS control field and eight bits of a queue size field in the QoS control field.

The buffer status indication information may be implemented by reusing a field in an existing QoS data packet, to reduce signaling overheads.

According to a fifth aspect, a data transmission apparatus is provided. The apparatus is configured to perform the methods provided in the first aspect and the third aspect. Specifically, the apparatus may include a module configured to perform any one of the first aspect, the third aspect, and the possible implementations of the first aspect and the third aspect.

According to a sixth aspect, a data transmission apparatus is provided. The apparatus is configured to perform the methods provided in the second aspect and the fourth aspect. Specifically, the apparatus may include a module configured to perform any one of the second aspect, the fourth aspect, and the possible implementations of the second aspect and the fourth aspect.

According to a seventh aspect, a data transmission apparatus is provided. The apparatus includes a processor. The processor is coupled to a memory, and may be configured to execute instructions in the memory, to implement the method according to any one of the first aspect, the third aspect, and the possible implementations of the first aspect and the third aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to an eighth aspect, a data transmission apparatus is provided. The apparatus includes a processor. The processor is coupled to a memory, and may be configured to execute instructions in the memory, to implement the method according to any one of the second aspect, the fourth aspect, and the possible implementations of the second aspect and the fourth aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a ninth aspect, a computer-readable storage medium is provided. The computer-readable storage medium stores a computer program. When the computer program is executed by an apparatus, the apparatus is enabled to implement the method according to any one of the first aspect, the third aspect, and the possible implementations of the first aspect and the third aspect.

According to a tenth aspect, a computer-readable storage medium is provided. The computer-readable storage medium stores a computer program. When the computer program is executed by an apparatus, the apparatus is enabled to implement the method according to any one of the second aspect, the fourth aspect, and the possible implementations of the second aspect and the fourth aspect.

According to an eleventh aspect, a computer program product including instructions is provided. When the instructions are executed by a computer, an apparatus is enabled to implement the method according to any one of the first aspect, the third aspect, and the possible implementations of the first aspect and the third aspect.

According to a twelfth aspect, a computer program product including instructions is provided. When the instructions are executed by a computer, an apparatus is enabled to implement the method according to any one of the second aspect, the fourth aspect, and the possible implementations of the second aspect and the fourth aspect.

According to a thirteenth aspect, a communication system is provided. The communication system includes the foregoing access point and station.

Figure 11:
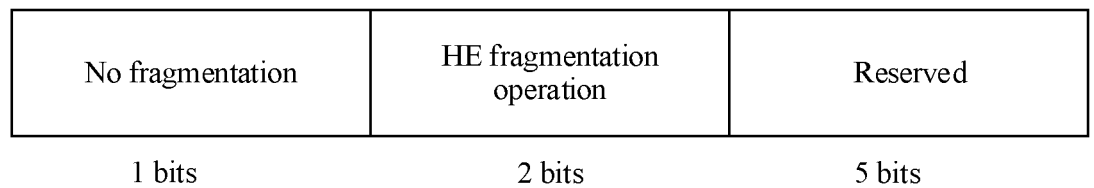
Figure 12:
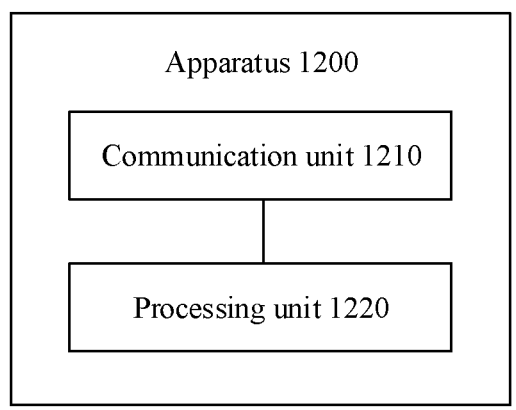
Figure 13:
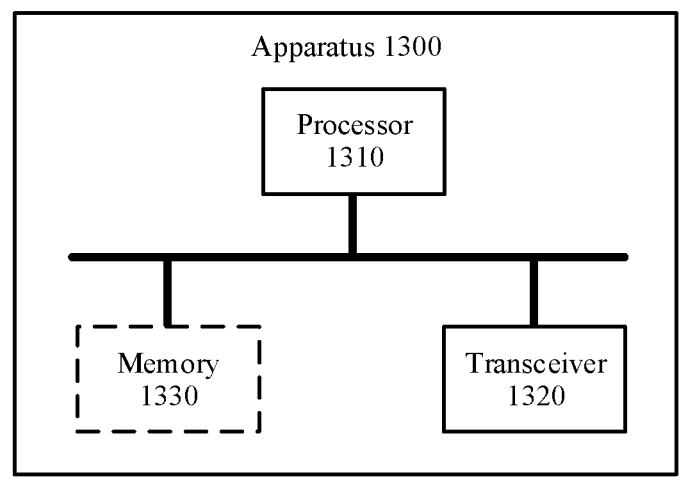
Figure 14:
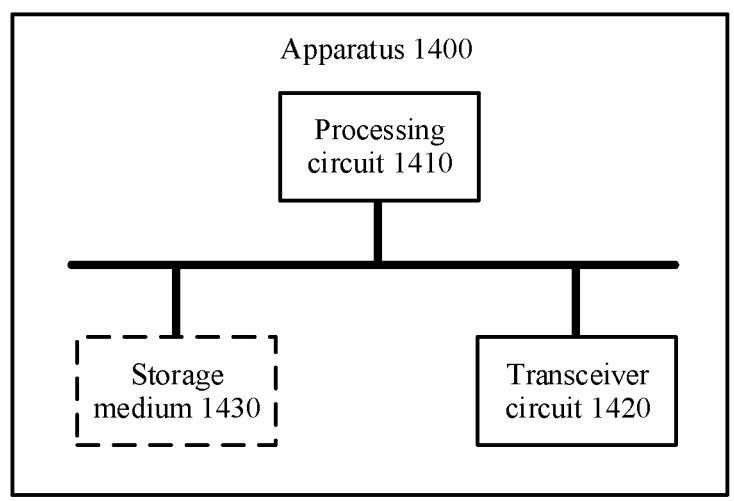

(a) to (c) in FIG. 8 are schematic diagrams of formats of BSR information according to an embodiment of this application;

FIG. 9 is a schematic diagram of a data packet according to an embodiment of this application;

FIG. 10 is a schematic diagram of a block acknowledgment parameter set field;

FIG. 11 is a schematic diagram of an ADDBA extension element according to an embodiment of this application;

FIG. 12 is a schematic block diagram of a data transmission apparatus according to an embodiment of this application;

FIG. 13 is another schematic block diagram of a data transmission apparatus according to an embodiment of this application; and FIG. 14 is still another schematic block diagram of a data transmission apparatus according to an embodiment of this application.

DESCRIPTION OF EMBODIMENTS

The following describes technical solutions of this application with reference to accompanying drawings.

The technical solutions in embodiments of this application may be applied to various communication systems, for example, a WLAN communication system, a global system for mobile communication (global system for mobile communication, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) system, a new radio (new radio, NR) system, or a future communication system.

For example, the following describes an application scenario in embodiments of this application and a method in embodiments of this application by using a WLAN system as an example.

Specifically, embodiments of this application may be applied to a WLAN, and embodiments of this application may be applied to any protocol in IEEE 802.11 series protocols currently used in the WLAN. The WLAN may include one or more basic service sets (basic service sets, BSSs), and network nodes of the BSSs include an AP and a STA. Each BSS may include one AP and multiple STAs associated with the AP.

In embodiments of this application, a transmit end and/or receive end may be a user station (STA) in the WLAN. The user station may also be referred to as a system, a subscriber unit, an access terminal, a mobile station, a remote station, a remote terminal, a mobile device, a user terminal, a terminal, a wireless communication device, a user agent, a user apparatus, or user equipment (user equipment, UE). The STA may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless local area network (for example, Wi-Fi) communication function, a wearable device, a computing device, or another processing device connected to a wireless modem.

In addition, the transmit end and/or the receive end in embodiments of this application may alternatively be APs in the WLAN. The AP may be configured to: communicate with an access terminal through the wireless local area network, and transmit data of the access terminal to a network side, or transmit data from a network side to the access terminal.

Figure 1:
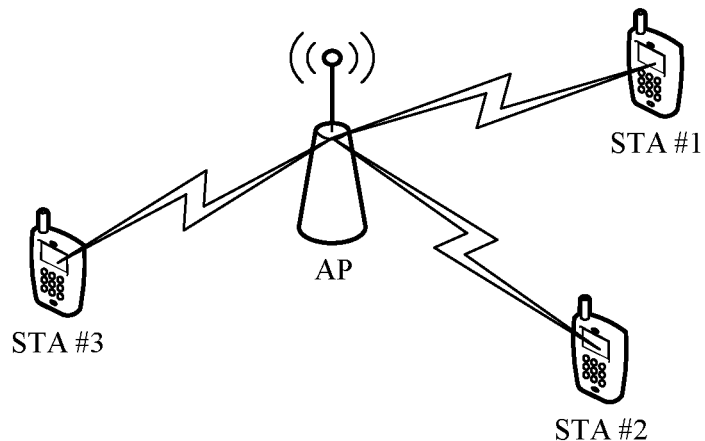
FIG. 1 is a schematic diagram of a communication system of a method applicable to an embodiment of this application.

For ease of understanding embodiments of this application, a communication system shown in FIG. 1 is first used as an example to describe in detail a communication system applicable to embodiments of this application. A scenario system shown in FIG. 1 may be a WLAN system. The WLAN system in FIG. 1 may include one or more APs and one or more STAs. In FIG. 1, communication between one AP (the AP shown in FIG. 1) and three STAs (a STA #1, a STA #2, and a STA #3 shown in FIG. 1) is used as an example.

Wireless communication may be performed between the AP and the STA according to various standards. For example, an uplink transmission manner between the AP and the STA includes but is not limited to an orthogonal frequency division multiple access (orthogonal frequency-division multiple access, OFDMA) manner, a multi-user multiple-input multiple-output (mulit-user multiple-input multiple-output, MU-MIMO) manner, an OFDMA and MU-MIMO hybrid transmission manner, or a single-user multiple-input multiple-output (single-user multiple-input multiple-output, SU-MIMO) technology.

The AP is also referred to as a wireless access point, a hotspot, or the like. The AP is an access point for a mobile user to access a wired network, and is mainly deployed in homes, buildings, and campuses, or is deployed outdoors. The AP is equivalent to a bridge that connects the wired network and a wireless network. The AP is mainly used to connect wireless network clients to each other, and then connect the wireless network to the Ethernet. Specifically, the AP may be a terminal device or a network device with a wireless fidelity (wireless fidelity, Wi-Fi) chip. Optionally, the AP may be a device that supports multiple WLAN standards such as 802.11.

Figure 2:
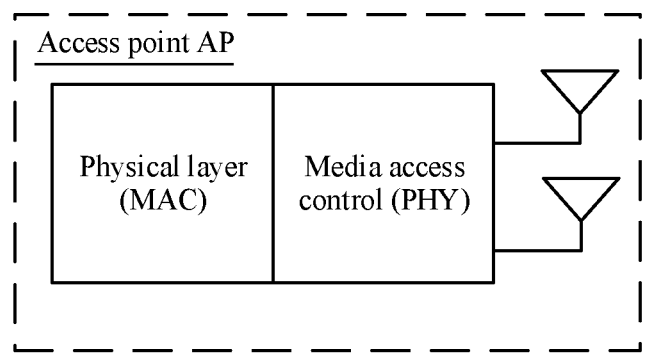
FIG. 2 is a diagram of an internal structure of an access point applicable to an embodiment of this application.

FIG. 2 shows a diagram of an internal structure of an AP. The AP may have multiple antennas or may have a single antenna. In FIG. 2, the AP includes a physical layer (physical layer, PHY) processing circuit and a media access control (media access control, MAC) processing circuit. The physical layer processing circuit may be configured to process a physical layer signal, and the MAC layer processing circuit may be configured to process a MAC layer signal.

Figure 3:
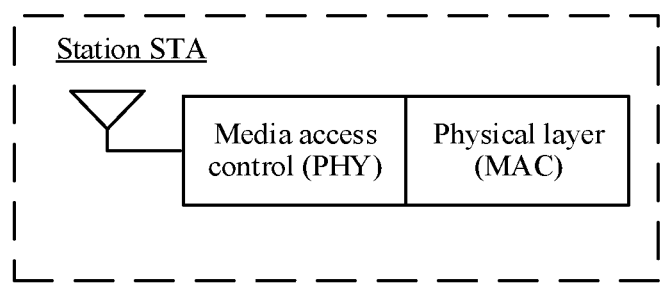
FIG. 3 is a diagram of an internal structure of a station applicable to an embodiment of this application.

An STA product is usually a terminal product, for example, a mobile phone, or a notebook computer, that supports the 802.11 series standards. FIG. 3 shows a diagram of a structure of a STA with a single antenna. In an actual scenario, the STA may alternatively have multiple antennas, and may be a device with more than two antennas. In FIG. 3, the STA may include a PHY processing circuit and a MAC processing circuit. The physical layer processing circuit may be configured to process a physical layer signal, and the MAC layer processing circuit may be configured to process a MAC layer signal.

Figure 4:
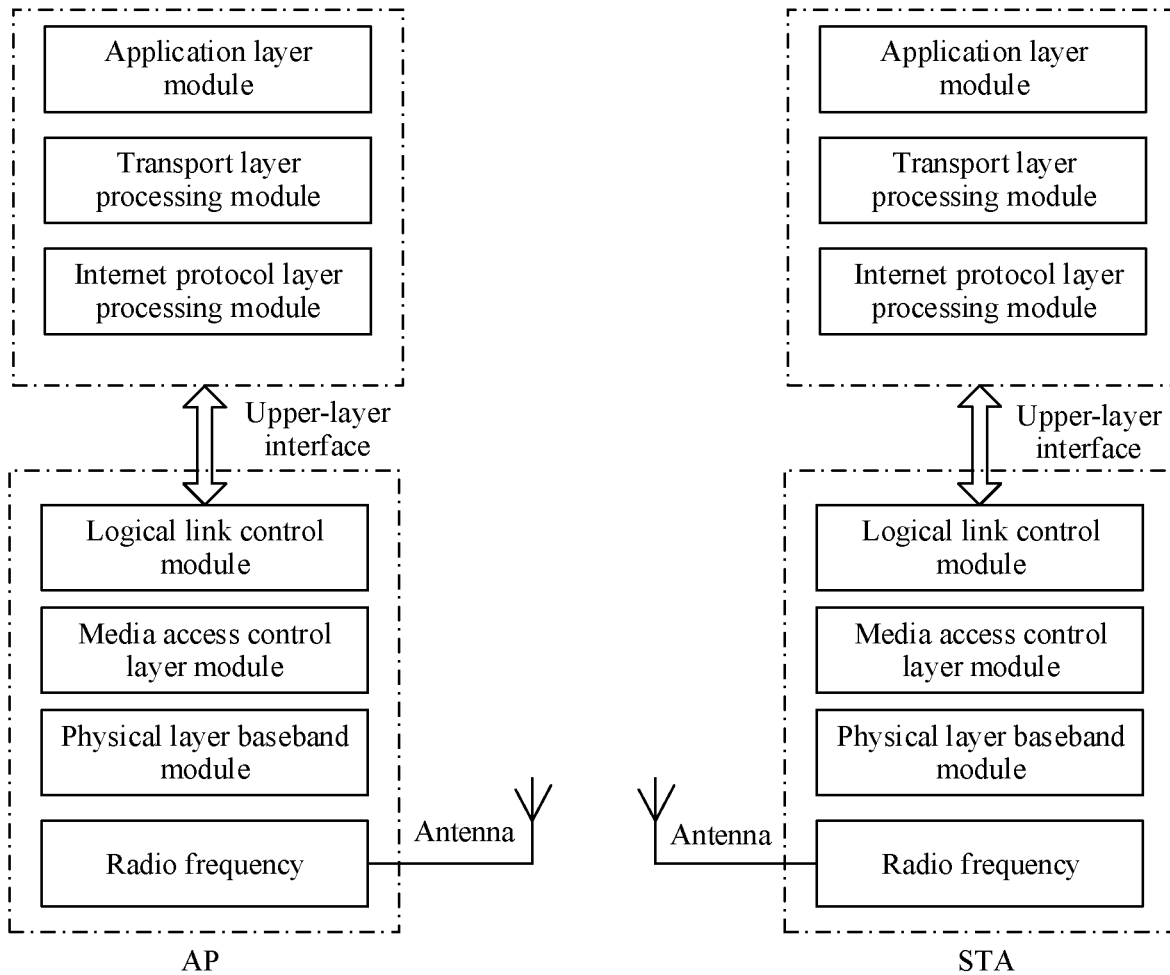
FIG. 4 is a diagram of structures of an AP and a STA according to an embodiment of this application.

It should be noted that FIG. 2 and FIG. 3 are merely simple schematic diagrams, and do not constitute any limitation on the protection scope of this application. For internal structures of the AP and the STA, refer to descriptions of the conventional technology, or refer to internal structures of an AP and a STA after future technology development, or may be in a form shown in FIG. 4. FIG. 4 is a diagram of structures of an AP and a STA according to an embodiment of this application. In addition, FIG. 4 is a diagram of internal structures of the AP and the STA. The AP and/or the STA may be configured with multiple antennas. The internal structures of the AP and the STA are not limited in this application, and details are not described again.

For ease of understanding embodiments of this application, several basic concepts in embodiments of this application are briefly described. It should be understood that basic concepts described below are briefly described by using a basic concept specified in a WLAN protocol as an example, but embodiments of this application are not limited to being applied only to a WLAN system. Therefore, standard names appearing when the WLAN system is used as an example for description are all functional descriptions, and specific names are not limited, indicate only functions of a device, and may be correspondingly expanded to another system, for example, an NR system or a future communication system.

1. OFDMA Technology

To greatly improve a service transmission rate of a WLAN system, the OFDMA technology is further used in the IEEE 802.11ax standard based on an existing OFDM technology. The OFDMA technology is developed based on the OFDM technology. The OFDMA technology is a combination of the OFDM technology and a frequency division multiple access (frequency division multiple access, FDMA) technology and is applicable to multi-user access. The technology has been adopted by international standards such as LTE and 5G due to its simple implementation and high spectrum utilization. In the OFDMA technology, a physical channel is divided into multiple resource blocks, each resource block includes multiple subcarriers (sub-channels), and each user may occupy one resource block for data transmission. Therefore, multiple users may perform parallel transmission, to reduce time overheads and a conflict probability of contention-based access of multiple users. In the OFDMA technology, because subcarriers overlap with each other, spectrum utilization is greatly improved.

2. 6 Gigahertz (Giga Hertz, GHz)

In 2017, during formulation of IEEE 802.11ax, the federal communications commission (federal communications commission, FCC) of the United States released a new free frequency band 5925 MHz to 7125 MHz. In this application, the free frequency band is referred to as 6 GHz for short. Therefore, an IEEE 802.11ax standard worker expands, in an IEEE 802.11ax project authorization application (project authorization request, PAR), an operating frequency band range of an IEEE 802.11ax-compliant device from 2.4 GHz and 5 GHz to 2.4 GHz, 5 GHz, and 6 GHz.

3. Multiple Links

Due to an increasingly high user requirement for quality of service of communication, it is difficult for the IEEE 802.11ax standard to meet user requirements in terms of a large throughput, low jitter, a low latency, and the like. Therefore, a next-generation IEEE technology, for example, the IEEE 802.11be standard, urgently needs to be developed.

A device in the IEEE 802.11 next-generation standard needs to be forward compatible, to be specific, compatible with the IEEE 802.11ax standard and an earlier standard. Therefore, the device in the IEEE 802.11 next-generation standard also supports an operating frequency band of an IEEE 802.11ax-compliant device. For example, the device in the IEEE 802.11 next-generation standard supports frequency bands such as 2.4 GHz, 5 GHz, and 6 GHz.

Specifically, channel division may be performed based on the latest free 6 GHz frequency band, so that a supported bandwidth may exceed a maximum bandwidth 160 MHz (for example, 320 MHz) supported at 5 GHz. On a same frequency band, a peak throughput may be improved through cooperation of multiple channels and the like, and a service transmission delay may be reduced. In addition to ultra-large bandwidth, a device in the IEEE 802.11ax next-generation standard may further improve the peak throughput in a manner such as cooperation of multiple frequency bands (2.4 GHz, 5 GHz, and 6 GHz). In this application, multiple frequency bands or multiple channels are collectively referred to as multiple links.

4. Multi-Link Device (Multi-Link Device, MLD)

In embodiments of this application, a next-generation IEEE 802.11 standard station device that supports multiple links is referred to as a multi-link device.

For example, two multi-link devices each include multiple STAs, and each STA in one multi-link device may set up a link to one STA in the other multi-link device for communication.

Alternatively, for example, two multi-link devices each include multiple APs, and each AP in one multi-link device may set up a link to one AP in the other multi-link device for communication.

Alternatively, for example, one of two multi-link devices includes multiple STAs, and the other multi-link device includes multiple APs. Each STA in the multi-link device may set up a link to one AP in the other multi-link device for communication.

Figure 5:
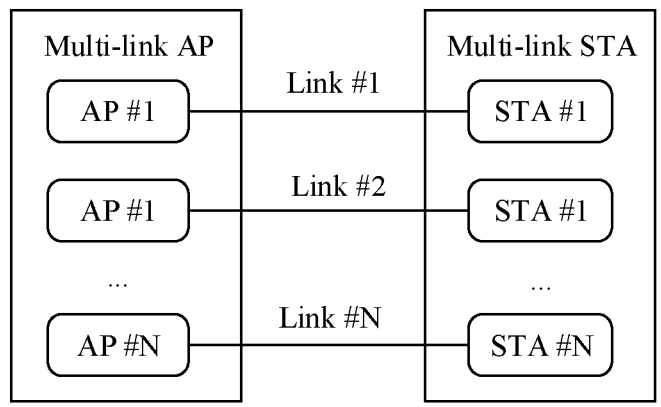
FIG. 5 is a schematic diagram of setting up links between a multi-link AP and a multi-link STA.

An operating frequency band of the multi-link device is all or a portion of 1 GHz, 2.4 GHz, 5 GHz, 6 GHz, and a high frequency 60 GHz. FIG. 5 is a schematic diagram of setting up links between a multi-link AP and a multi-link STA.

It can be learned from FIG. 5 that the multi-link AP includes NAP entities (an AP #1, an AP #2, and an AP #N shown in FIG. 5). The multi-link STA includes N STA entities (a STA #1, a STA #2, and a STA #N shown in FIG. 5). The N STA entities may share a MAC layer.

Further, the AP #1 in the multi-link AP communicates with the STA #1 in the multi-link STA over a link (a link #1 shown in FIG. 5). The AP #2 in the multi-link AP communicates with the STA #2 in the multi-link STA over a link (a link #2 shown in FIG. 5). The AP #N in the multi-link AP communicates with the STA #N in the multi-link STA over a link (a link #N shown in FIG. 5).

It should be noted that, although multiple links are configured in IEEE 802.11ax and an earlier standard, different BSSs are set up for the multiple links, and at one moment, generally, communication can only be performed over one link with a station in a BSS to which the link belongs.

A device in the IEEE 802.11 next-generation standard not only uses continuous ultra-large bandwidth of the new frequency band 6 GHz, but may also use a multi-link cooperation technology to aggregate multiple discontinuous links to form ultra-large bandwidth. In addition to aggregating a higher bandwidth, the multi-link cooperation technology may further be used to simultaneously send a data packet of a same service to a same station.

5. TID-to-Link Mapping

In a multi-link device operation, to better control service transmission over each link, the IEEE 802.11ax next-generation standard needs to define a TID-to-link mapping mechanism, to indicate links to which one or more TIDs (in the IEEE 802.11ax, there are a total of eight types of services transmitted based on enhanced distributed channel access (enhanced distributed channel access, EDCA)) are respectively mapped for transmission. By default, each TID can be transmitted over any link. However, after a multi-link STA and a multi-link AP negotiate TID-to-link mapping, each TID can only be transmitted over one or more links to which the TID is mapped.

6. Buffer Status Report Mechanism

It can be learned from the foregoing description that an OFDMA technology is introduced into IEEE 802.11ax. To assist in uplink OFDMA scheduling, a STA needs to report an uplink service to an AP, to help the AP correctly allocate a resource block size when scheduling uplink OFMDA transmission.

An uplink service report mechanism specified in an existing protocol is that when sending a quality of service (quality of service, QoS) data frame (the QoS data frame in this application includes a QoS null data frame), a STA includes BSR signaling in a high throughput control (high throughput control, HT-control) field in a MAC header. The HT-control field is 4 bytes, the 4 bytes carry 2-bit indication information, and the indication information indicates that HT-control is high throughput (high throughput, HT) control signaling, or very high throughput (very high throughput, VHT) control signaling, or high efficiency (high efficiency, HE) control signaling.

For example, in the HE control signaling, each type of control information includes a 4-bit control identifier (control ID), control information, and zero or more padding bits. The control identifier is used to identify a type of the control signaling, and the control identifier is closely followed by corresponding control information.

Figures 6, 7:
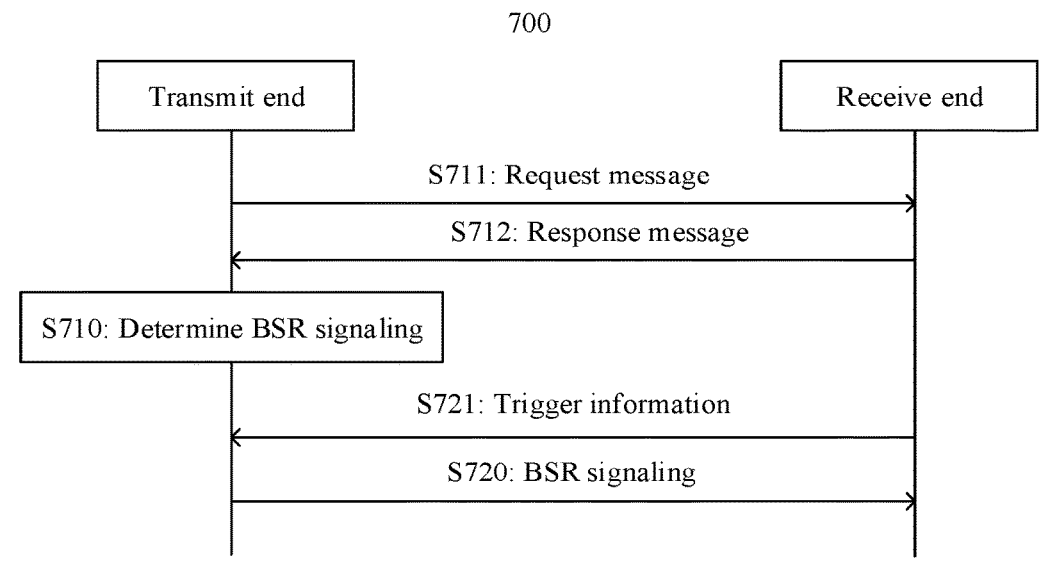
FIG. 6 is a schematic diagram of a format of BSR information.
FIG. 7 is a schematic flowchart of a data transmission method 700 according to an embodiment of this application.

This application relates to uplink buffer status report control information. A value of a control identifier of BSR information is 3, and control information of the BSR information includes 26 bits. Specifically, as shown in FIG. 6, FIG. 6 is a schematic diagram of a format of BSR signaling. It can be learned from FIG. 6 that BSR information includes an access category identifier (access category identifier, ACI) bitmap (ACI bitmap) field, a delta TID (delta TID) field, an ACI high (ACI high) field, a scaling factor (scaling factor) field, a queue size high (queue size high) field, and a queue size all (queue size all) field. A queue in this application is understood as buffer. A function of each field in the BSR information is described in detail as follows:

(1) The ACI bitmap field indicates access categories (access categories, ACs) of which there is a buffered service.

(2) The ACI bitmap field and the delta TID field jointly indicate a quantity of TIDs of which there is a buffered service.

(3) The ACI high field indicates which AC is an AC with a high priority for this buffer status report.

(4) The scaling factor field indicates a queue size unit (for example, 16 bytes, 256 bytes, 2048 bytes, or 32768 bytes).

(5) The queue size high field indicates a size of a buffered service of an AC corresponding to a high-priority ACI in this buffer status report.

(6) The queue size all field indicates a total size of buffered services of all ACs in this buffer status report.

Specifically, a manner of calculating a size of a buffered service is as follows:

Size of the buffered service=(Value of the queue size field+1)*Value of the scaling factor field  (formula 1)

The value of the queue size field includes a value of the queue size high field or a value of the queue size all field. When the value of the queue size field in the formula 1 is the value of the queue size high field, the calculated value is the size of the buffered service of the AC corresponding to the high-priority ACI. When the value of the queue size field in the formula 1 is the value of the queue size all field, the calculated value is the total size of the buffered services of all the ACs.

Further, if the queue size field is equal to 254, it indicates that a size of a corresponding buffered service is greater than 254* a scaling factor. If the queue size field is equal to 255, it indicates that a size of a corresponding buffered service is unknown.

It can be learned from the foregoing description that the buffer status report mechanism in IEEE 802.11ax is AC-based reporting. In this mechanism, a multi-link AP cannot determine, based on a service of a specific AC, a size of a service that is of a multi-link STA and that is on each link, and therefore cannot efficiently perform uplink multi-station scheduling.

In addition, the following descriptions are first provided to facilitate understanding of embodiments of this application.

First, in this application, "indicate" may include "directly indicate" and "indirectly indicate". When a piece of indication information is described as indicating A, the indication information may directly indicate A or indirectly indicate A, but it does not necessarily indicate that the indication information carries A.

The information indicated by the indication information is referred to as to-be-indicated information. In a specific implementation process, there are multiple manners of indicating the to-be-indicated information, for example, but not limited to, the following manners: The to-be-indicated information is directly indicated, for example, the to-be-indicated information or an index of the to-be-indicated information is indicated. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of multiple pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information.

Second, "first", "second", and various numerical numbers (for example, "#1", and "#2") shown in this application are merely for ease of description, and are used for distinguishing between objects, but are not intended to limit the scope of embodiments of this application. For example, the numbers are used for distinguishing between different information, or distinguishing between different STAs, but are not used for describing a particular order or sequence. It should be understood that the objects described in this way are interchangeable in a proper circumstance, so that a solution other than embodiments of this application can be described.

Third, in embodiments of this application, "preset" may include "indicated by a device by using signaling" or "predefined", for example, "defined in a protocol". "Predefined" may be implemented by storing corresponding code or a table in a device (for example, the device includes a station and an access point) in advance, or may be implemented in another manner that can indicate related information. A specific implementation of "predefined" is not limited in this application. For example, "predefined" may be "defined in a protocol".

Fourth, "storage" in embodiments of this application may be storage in one or more memories. The one or more memories may be separately disposed, or may be integrated into an encoder, a decoder, a processor, or a communication apparatus. Alternatively, a part of the one or more memories may be separately disposed, and a part of the one or more memories are integrated into the translator, the processor, or the communication apparatus. A type of the memory may be a storage medium in any form, and this is not limited in this application.

Fifth, in embodiments of this application, "protocol" may be a standard protocol in the communication field, for example, may include an LTE protocol, an NR protocol, a WLAN protocol, and a related protocol applied to a subsequent communication system. This is not limited in this application.

Sixth, in embodiments of this application, "of (of)", "corresponding (corresponding, relevant)", and "corresponding (corresponding)" may be interchangeably used sometimes. It should be noted that meanings expressed by the terms are consistent when differences are not emphasized.

The foregoing briefly describes the buffer status report mechanism specified in the existing protocol, and points out that the existing buffer status report mechanism is not well applicable to a multi-link device operation due to AC-based reporting. To resolve a disadvantage existing in the existing buffer status report mechanism, this application provides a data transmission method, which is applicable to a buffer status report mechanism of a multi-link device.

The following describes in detail technical solutions provided in this application with reference to the accompanying drawings. Embodiments of this application may be applied to multiple different scenarios, including but not limited to the scenario shown in FIG. 1. For example, for uplink transmission, a STA may be used as a transmit end, and an AP may be used as a receive end. For downlink transmission, the AP may be used as a transmit end, and the STA may be used as a receive end. For another transmission scenario, for example, data transmission between APs, one AP may be used as a transmit end, and the other AP may be used as a receive end. For another example, for uplink transmission between STAs, one STA may be used as a transmit end, and the other STA may be used as a receive end. Therefore, the following describes embodiments of this application based on a transmit end device and a receive end device.

It should be further understood that, a specific structure of an execution body of a method provided in embodiments of this application is not specifically limited in the following embodiments, provided that a program that records code of the method provided in embodiments of this application can be run to perform communication according to the method provided in embodiments of this application. For example, the method provided in embodiments of this application may be performed by the receive end device or the transmit end device, or a functional module that is in the receive end device or the transmit end device and that can invoke a program and execute the program.

Without loss of generality, the data transmission method provided in embodiments of this application is described in detail below by using interaction between a transmit end device and a receive end device as an example. The transmit end device and the receive end device in embodiments of this application are multi-link devices. A data transmission manner between multi-link devices is shown in FIG. 5, and details are not described herein again.

FIG. 7 is a schematic flowchart of a data transmission method 700 according to an embodiment of this application. The method 700 shown in FIG. 7 may include some or all of the following steps.

S710: A multi-link transmit end determines BSR signaling.

The BSR signaling indicates a multi-link receive end to schedule a station of the multi-link transmit end over one or more links. For example, OFDMA scheduling is performed.

It should be noted that, in this embodiment of this application, how the multi-link receive end performs station scheduling based on the BSR signaling is not limited. Refer to a manner in which a multi-link receive end schedules a user station based on BSR signaling reported by a multi-link transmit end in an existing protocol. A difference between station scheduling performed by the multi-link receive end in this embodiment of this application and station scheduling performed by a receive end in the conventional technology lies in that the multi-link receive end in this embodiment of this application may schedule the station of the multi-link transmit end over the one or more links. For scheduling on each link, refer to station scheduling specified in the existing protocol.

For example, the multi-link transmit end can determine, based on a size of a locally buffered service and a mapping relationship between multiple links and a TID, a format of the BSR signaling sent to the multi-link receive end.

For example, in this embodiment of this application, the format of the BSR signaling determined by the multi-link transmit end is shown in FIG. 8. FIG. 8 is a schematic diagram of the BSR signaling according to an embodiment of this application.

In a possible implementation, it can be seen from FIG. 8(a) that, the BSR signaling includes one or more of a queue size all field of a transmission link, a scaling factor field of the transmission link, a TID field, a queue size field, and a first scaling factor field. The following briefly describes functions of the fields included in the BSR signaling shown in FIG. 8(a).

(1) The queue size all field of the transmission link indicate a size of a first buffered service on a link over which the BSR signaling is sent.

Specifically, a manner of calculating the size of the first buffered service on the link is:

Size of the first buffered service=(Value of the queue size all field of the transmission link+1)*Value of the scaling factor field of the transmission link     (formula 2)

(2) The scaling factor field of the transmission link indicates a unit (for example, 16 bytes, 256 bytes, 2048 bytes, or 32768 bytes) of the size of the first buffered service indicated by the queue size all field of the transmission link.

(3) The TID field indicates a currently reported first service type.

(4) The queue size field indicates a size of a second buffered service that is corresponding to the first service type indicated by the TID field and that is included in buffered services of the transmit end.

Specifically, a manner of calculating the size of the second buffered service corresponding to the first service type is as follows:

Size of the second buffered service=(Value of the queue size field+1)*Value of the first scaling factor field     (formula 3)

(5) The value of the first scaling factor field indicates a unit (for example, 16 bytes, 256 bytes, 2048 bytes, or 32768 bytes) of the size of the second buffered service indicated by the queue size field.

Optionally, if $Q\_T=2^{(q\_T)}-2$, it indicates that the size of the first buffered service>$(2^{(q\_T)})$*the value of the scaling factor field of the transmission link; and/or if $Q\_TID=2^{(q\_TID)}-2$, it indicates that the size of the second buffered service>$(2^{(q\_TID)})$*the value of the first scaling factor field.

If $Q\_T=2(q\_T)-1$, it indicates that the size of the first buffered service is unknown; and/or if $Q\_TID=2(q\_TID)-1$, it indicates that the size of the second buffered service is unknown.

Q_T represents the value of the queue size all field of the transmission link, q_T represents a quantity of bits of the queue size all field of the transmission link, Q_TID represents the value of the queue size field, and q TID represents a quantity of bits of the queue size field.

Specifically, a maximum size that can be indicated by the queue size all field of the transmission link and that is of the first buffered service=$(2^{10}-2)*32768=1022*32768$ bytes=33488896 bytes, and the queue size field can indicate that a maximum size of the second buffered service=$(2^9-2)*32768=510*32768$ bytes=16711680 bytes. This meets a large throughput requirement of 802.11be.

It should be noted that a quantity of bits occupied by each field included in the BSR signaling in FIG. 8(a) is merely an example, and does not constitute any limitation on the protection scope of this application. The quantity of bits occupied by each field included in the BSR signaling may alternatively be another value. For example, the queue size all field of the transmission link included in the BSR signaling in FIG. 8(a) may occupy 9 bits or 11 bits. The quantity of bits occupied by each field can represent a value of each field. A specific quantity is not limited, and examples are not enumerated herein.

In another possible implementation, it can be seen from FIG. 8(b) that the BSR signaling includes one or more of a first TID field (a TID #1 field shown in FIG. 8(b)), a first queue size field (a queue #1 size field shown in FIG. 8(b)), a TID #2 field, a second queue size field (a queue #2 size field shown in FIG. 8(b)), and a second scaling factor field. The following briefly describes usage of each field included in the BSR signaling.

(1) The TID #1 field indicates a currently reported second service type.

(2) The queue #1 size field indicates a size that is of a third buffered service corresponding to the second service type indicated by the TID #1 field and that is included in a buffer of the transmit end.

Specifically, a manner of calculating the size of the third buffered service corresponding to the second service type is as follows:

Size of the third buffered service=(Value of the queue #1 size field+1)*Value of the second scaling factor field  (formula 4)

(3) The TID #2 field indicates a currently reported third service type.

(4) The queue #2 size field indicates a size that is of a fourth buffered service corresponding to the third service type indicated by the TID #2 field and that is included in the buffer of the transmit end.

Specifically, a manner of calculating the size of the fourth buffered service corresponding to the third service type is as follows:

Size of the fourth buffered service=(Value of the queue #2 size field+1)*Value of the second scaling factor field  (formula 5)

(5) The value of the second scaling factor field indicates units (for example, 16 bytes, 256 bytes, 2048 bytes, and 32768 bytes) of the size of the third buffered service and the size of the fourth buffered service.

Optionally, if $Q\_1=2^{(q\_1)}-2$, it indicates that the size of the third buffered service>$(2^{(q\_1)})$*a second scaling factor; and/or if $Q\_2=2^{(q\_2)}-2$, it indicates that the size of the fourth buffered service>$(2^{(q\_2)})$*the second scaling factor.

If $Q\_1=2^{(q\_1)}-1$, it indicates that the size of the third buffered service is unknown; and/or if $Q\_2=2^{(q\_2)}-2$, it indicates that the size of the fourth buffered service is unknown.

Q_1 represents the value of the queue #1 size field, q_1 represents a quantity of bits of the size field of the queue #1, Q_2 represents the value of the queue #2 size field, and q_2 represents a quantity of bits of the queue #2 size field.

Specifically, the reported queue size fields of two TIDs can indicate that a maximum buffer size=510*32768 bytes=16711680 bytes. This meets a large throughput requirement of 802.11be.

It should be noted that a quantity of bits occupied by each field included in the BSR signaling in FIG. 8(b) is merely an example, and does not constitute any limitation on the protection scope of this application. The quantity of bits occupied by each field included in the BSR signaling may alternatively be another value. For example, the queue #1 size field included in the BSR signaling in FIG. 8(b) may occupy less than or greater than 9 bits. The quantity of bits occupied by each field can represent a value of each field. A specific quantity is not limited, and examples are not enumerated herein.

In still another possible implementation, it can be learned from FIG. 8(c) that the BSR signaling includes one or more of a third TID field (a TID #1 field shown in FIG. 8(c)), a third queue size field (a queue #1 size field shown in FIG. 8(c)), a third scaling factor field, a fourth TID field (a TID #2 field shown in FIG. 8(c)), a fourth queue size field (a queue #2 size field shown in FIG. 8(c)), and a scaling factor difference field. The following briefly describes usage of each field included in the BSR signaling.

(1) The TID #1 field indicates a currently reported fourth service type.

(2) The queue #1 size field indicates a size that is of a fifth buffered service corresponding to the fourth service type indicated by the TID #1 field and that is included in a buffer of the transmit end.

Specifically, a manner of calculating the size of the fifth buffered service corresponding to the fourth service type is as follows:

Size of the fifth buffered service=(Value of the queue #1 size field+1)*Value of a scaling factor field  (formula 6)

(3) A value of the third scaling factor field indicates a unit (for example, 16 bytes, 256 bytes, 2048 bytes, or 32768 bytes) of the size of the fifth buffered service indicated by the queue #1 size field.

(4) The TID #2 field indicates a currently reported fifth service type.

(5) The queue #2 size field indicates a size that is of a sixth buffered service corresponding to the fifth service type indicated by the TID #2 field and that is included in the buffer of the transmit end.

Specifically, a manner of calculating the size of the sixth buffered service corresponding to the fifth service type is as follows:

Size of the sixth buffered service=(Value of the queue #2 size field+1)*Value of a scaling factor field       (formula 7); or Size of the sixth buffered service=(Value of the queue #2 size field+1)*Value greater than a value of a scaling factor field       (formula 8)

(6) The scaling factor difference field and the third scaling factor field jointly indicate a unit that is of the size of the sixth buffered service and that is indicated by the queue #2 size field.

Optionally, when the scaling factor difference field is set to a first value (for example, 0), the unit that is of the size of the sixth buffered service and that is indicated by the queue #2 size field is indicated by using the scaling factor field. This is corresponding to the foregoing calculation manner of the formula 7. When the scaling factor difference field is set to a second value (for example, 1), the unit that is of the size of the sixth buffered service and that is indicated by the queue #2 size field is a larger value following the unit indicated by the scaling factor field. This is corresponding to the foregoing calculation manner of the formula 8.

It should be noted that, a specific manner of calculating a size that is of a buffered service corresponding to a service type indicated by the TID #2 field and that is indicated by the queue #2 size field in the buffer of the transmit end may be another calculation manner. Details are not described herein again.

In addition, it should be further noted that, in this embodiment of this application, the format of the BSR signaling determined by the multi-link transmit end may include one or more signaling fields mentioned in each of the foregoing three manners.

It should be noted that, in this embodiment of this application, the format of the BSR signaling determined by the multi-link transmit end may alternatively be a combination of one or more signaling fields in the foregoing three manners.

Several possible forms of the BSR signaling are described in detail above with reference to FIG. 8. It should be understood that when determining the format of the BSR signaling, the multi-link transmit end needs to learn, based on a mapping relationship between a TID and multiple links (TID-to-link), links over which buffered services indicated by different TIDs are sent.

For example, in this embodiment of this application, the mapping relationship that is between the TID and the multiple links and that is learned by the multi-link transmit end may be determined by negotiating with the receive end.

The multi-link transmit end sends a request message to the multi-link receive end, where the request message is used for requesting to negotiate the TID-to-link mapping relationship. The multi-link receive end sends a response message to the multi-link transmit end, where the response message is used for responding to the negotiated TID-to-link mapping relationship.

In other words, the method shown in FIG. 7 further includes: S711: The transmit end sends the request message to the receive end. S712: The receive end sends the response message to the transmit end.

In a possible implementation, the request message is a request management frame, and the response message is a response management frame. In this implementation, after sending the request management frame to the multi-link receive end, the multi-link transmit end receives an acknowledgment (acknowledge, ACK) frame returned by the multi-link receive end. After sending the response management frame to the multi-link transmit end, the multi-link receive end receives an ACK frame returned by the multi-link transmit end. In this process, the transmit end and the receive end complete negotiation of the TID-to-link mapping relationship.

In another possible implementation, TID-to-link mapping negotiation may alternatively be performed in a block acknowledgment setup session, the request message is an ADDBA request frame, and the response message is an ADDBA response frame. In this implementation, a single MAC protocol data unit (MAC protocol data unit, MPDU) of each TID that does not need a block acknowledgment or that is under no acknowledgment protocol is transmitted over all links, where the all the links are links in multi-link setup.

In still another possible implementation, the request message and the response message are other frames, for example, management frames used for negotiating the TID-to-link mapping relationship.

For example, the multi-link transmit end may learn the TID-to-link mapping relationship between the TID and the multiple links through protocol predefinition. The multi-link transmit end and the multi-link receive end do not need to determine the mapping relationship by using the foregoing negotiation process.

To be compatible with signaling interaction between an existing multi-link transmit end and an existing multi-link receive end, the following mainly uses an example in which the request message is a request management frame and the response message is a response management frame to describe negotiation of a TID-To-Link mapping relationship between the multi-link transmit end and the multi-link receive end.

Specifically, the request management frame and the response management frame each carry information related to the TID-to-link mapping relationship between the TID and the multiple links. The information related to the TID-to-link mapping relationship includes control information and one or more pieces of mapping information. The control information is used for controlling how to set up the TID-to-link mapping relationship, and the mapping information indicates the TID-to-link mapping relationship.

The control information includes at least one of the following possibilities:

Possibility 1: When the request management frame carries a TID-to-link mapping control information field with a value of 0, it indicates that a TID-to-Link mapping is requested (request TID-to-link mapping). The control information field is used for requesting to set up the TID-to-link mapping. In the possibility 1, the multi-link transmit end requests to set up the TID-to-link mapping, and mapping information may be "null" or a special value (for example, 0).

Possibility 2: When the request management frame carries a TID-to-link mapping control information field with a value of 1, it indicates that a TID-to-Link mapping is suggested (suggest TID-to-link mapping). The control information field is used for suggesting a mapping relationship to be set up. In the possibility 2, the multi-link transmit end requests to set up the TID-to-link mapping relationship and provides the suggested TID-to-link mapping relationship. If the suggested TID-to-link mapping relationship is not satisfied, negotiation for setting up the TID-to-link mapping relationship is still accepted.

Possibility 3: When the request management frame carries a TID-to-link mapping control information field with a value of 2, it indicates that a TID-to-link mapping is demanded (demand TID-to-link mapping). The control information field is used for demanding to set up a specific TID-to-link mapping relationship. In possibility 3, the multi-link transmit end requests to set up the TID-to-link mapping relationship, and provides the demanded TID-to-link mapping relationship. If the demanded TID-to-link mapping relationship is not satisfied, negotiation for setting up the TID-to-link mapping relationship is not accepted.

Possibility 4: When the response management frame carries a TID-to-link mapping control information field with a value of 3, it indicates that a TID-to-link mapping is accepted (accept TID-to-link mapping), and the control information field is used for accepting setup of the TID-to-link mapping relationship. In the possibility 4, the multi-link receive end receives a TID-to-link mapping relationship setup request sent by the multi-link transmit end, but TID-to-link mapping information is sent by the multi-link receive end, that is, carried in the response management frame.

Possibility 5: When the response management frame carries a TID-to-link mapping control information field with a value of 4, it indicates that a TID-to-link mapping is alternated (alternate TID-to-link mapping). The control information field is used for alternating the TID-to-link mapping relationship. In the possibility 5, a TID-to-link mapping relationship suggested by the multi-link receive end is different from a suggested TID-to-link mapping relationship or a demanded TID-to-link mapping relationship sent by the multi-link transmit end.

Possibility 6: When the response management frame carries a TID-to-link mapping control information field with a value of 5, it indicates that a TID-to-link mapping is dictated (dictateTID-to-link mapping). The control information field indicates the TID-to-link mapping. In the possibility 6, a TID-to-link mapping relationship demanded by the multi-link receive end is different from a suggested TID-to-link mapping relationship or a demanded TID-to-link mapping relationship sent by the multi-link transmit end.

Possibility 7: When the response management frame carries a TID-to-link mapping control information field with a value of 6, it indicates that a TID-to-link mapping is rejected (reject TID-to-link mapping). The control field information is used for rejecting to set up the TID-to-link mapping relationship. In the possibility 7, the multi-link receive end rejects a TID-to-link mapping setup request sent by the multi-link transmit end.

The foregoing possibility 1 to possibility 7 may be represented by using the following Table 1:

TABLE 1

| Value of a TID-to-link mapping control information field | Control information name | Description of a transmit end that sends a request management frame | Description of a receive end that sends a response management frame |
| --- | --- | --- | --- |
| 0 | Request TID-to-link mapping | The multi-link transmit end requests a TID-to-link mapping, and TID-to-link mapping information is 0. | None |
| 1 | Suggest TID-to-link mapping | The multi-link transmit end requests a TID-to-link mapping and provides a suggested TID-to-link mapping. If the suggested TID-to-link mapping is not satisfied, TID-to-link mapping negotiation is still accepted. | None |
| 2 | Demand TID-to-link mapping | The multi-link transmit end requests a TID-to-link mapping and provides a demanded TID-to-link mapping. If a suggested TID-to-link mapping that is demanded is not satisfied, TID-to-link mapping negotiation is not accepted. | None |
| 3 | Accept TID-to-link mapping | None | The multi-link receive end accepts a TID-to-link mapping request sent by the multi-link transmit end, but TID-to-link mapping information is sent by the receive end. |
| 4 | Alternate TID-to-link mapping | None | TID-to-link mapping information suggested by the multi-link receive end is different from suggested TID-to-link mapping information or demanded TID-to-link mapping information sent by the multi-link transmit end. |

TABLE 1-continued

| Value of a TID-to-link mapping control information field | Control information name | Description of a transmit end that sends a request management frame | Description of a receive end that sends a response management frame |
|---|---|---|---|
| 5 | Dictate TID-to-link mapping | None | TID-to-link mapping information demanded by the multi-link receive end is different from suggested TID-to-link mapping information or demanded TID-to-link mapping information sent by the multi-link transmit end. |
| 6 | Reject TID-to-link mapping | None | The multi-link receive end rejects a TID-to-link mapping request sent by the multi-link transmit end. |

Further, the TID-to-link mapping information includes the following possibilities:

Possibility 1:

The TID-to-link mapping information includes N link identifier bitmaps, and N is a positive integer. Each link identifier bitmap is corresponding to one TID, a length of the link identifier bitmap is fixed, and a bit whose value is 1 in the link identifier bitmap indicates that a TID corresponding to the link identifier bitmap is corresponding to a link identified by a position of the bit whose value is 1 in the bitmap, so that a TID-to-link mapping is set up.

For example, there are eight TIDs in total, and the TID-to-link mapping information includes eight link identifier bitmaps, which are 11000000, 10000000, 11100000, 11000000, 10100000, 11000000, 10000000, and 10000000. 11000000 is corresponding to a TID #1, and a bit whose value is 1 in 11000000 is located in a first bit and a second bit in the bitmap. In this case, it indicates that the TID #1 is mapped to a link #1 and a link #2. Similarly, a TID #2 is mapped to the link #1, a TID #3 is mapped to the link #1, the link #2 and a link #3, a TID #4 is mapped to the link #1 and the link #2, a TID #5 is mapped to the link #1 and the link #3, a TID #6 is mapped to the link #1 and the link #2, a TID #7 is mapped to the link #1, and a TID #8 is mapped to the link #1.

It should be understood that in the possibility 1, that the TID corresponding to the link identifier bitmap is corresponding to the link indicated by the position of the bit whose bit value is 1 in the link identifier bitmap is merely an example, and does not constitute any limitation on the protection scope of this application. For example, a position of a bit whose bit value is 0 is located may be determined, to determine a link corresponding to the TID. Details are not described herein again.

Possibility 2:

The TID-to-link mapping information includes a control field and N link identifier bitmap fields, and N is a positive integer.

The control field includes a quantity of TIDs that need to be mapped or a TID bitmap. Optionally, the control field may further include a quantity of links. In addition, the quantity of links may be located in another position in a multi-link setup request frame and/or a multi-link setup response frame. This is not limited in this application.

A field of the link identifier bitmap field depends on the quantity of TIDs that need to be mapped or depends on a quantity of bits that are set to a first value in the TID bitmap (for example, a quantity of bits that are set to 1 in the TID bitmap). A length of the link identifier bitmap field may be determined by the quantity of links, or may be a fixed length.

Further, a TID that does not need to be mapped implicitly indicates that the TID can be transmitted over all links, where all the links are links set up in a multi-link setup process.

If the TID-to-link mapping information includes the quantity of TIDs, a link identifier bitmap further needs to include a corresponding TID identifier number. If the TID-to-link mapping information includes the TID bitmap, a link identifier bitmap does not need to include a link identifier number.

For example, if the TID bitmap is 11000000, the quantity of links is 3, and two link identifier bitmap fields are 110 and 101, it indicates that a TID #1 is mapped to a link #1 and a link #2, a TID #2 is mapped to the link #1 and a link #3, and a TID #3 to a TID #8 are mapped to all links (the link #1, the link #2, and the link #3).

For another example, the quantity of TIDs is 2, the quantity of links is 3, and two link identifier bitmap fields are TID #1 110 101 and TID #2 101, where a TID #1 and a TID #2 also need to be indicated by using a sequence, and are indicated by using four bits or three bits. If the TID #1 is 0000, and the TID #2 is 0001, it indicates that TID #1 is mapped to a link #1 and a link #2, and the TID #2 is mapped to the link #1 and a link #3, a TID #3 to a TID #8 are mapped to all links (the link #1, the link #2, and the link #3).

Optionally, if there is no link quantity indication field, the length of the link identifier bitmap field (excluding a TID identifier) is fixed, for example, is 8 bits.

It should be noted that, if bits of the TID bitmap are all set to a second value (for example, the bits of the TID bitmap are all set to 0), it indicates that each TID is mapped to all the links.

In addition, the TID-to-link mapping information may alternatively include multiple TID bitmaps and multiple link identifiers, a quantity of TID bitmaps is equal to a quantity of links, and each TID bitmap is 8 bits. Each TID bitmap indicates which TIDs are mapped to a corresponding link. For example, the quantity of links is 2, two TID bitmaps are 11110000 and 00001111, two link identifiers are a link #2 and a link #3, where the link identifiers may be represented by multiple bits. In this case, it indicates that a TID #1 to a TID #4 are mapped to the link #2, and a TID #5 to a TID #8 are mapped to the link #3.

It should be noted that, after the multi-link transmit end and the multi-link receive end negotiate to set up the TID-to-link mapping relationship, the TID-to-link mapping relationship may be changed later.

For example, after the multi-link transmit end and the multi-link receive end set up a first TID-to-link mapping relationship, sizes of buffered services on different links on a side of the multi-link transmit end change, or a service volume on each link changes (a reason why the TID-to-link mapping relationship needs to be updated is not limited in this application). The multi-link transmit end and the multi-link receive end may re-negotiate a second TID-to-link mapping relationship, for example, re-negotiate by using another management frame. The first TID-to-link mapping relationship may be different from the second TID-to-link mapping relationship.

It should be further understood that, the foregoing process of negotiating, by the multi-link transmit end and the multi-link receive end, to set up the TID-to-link mapping relationship may be independently applied. In other words, there is no need to limit that BSR signaling needs to be transmitted between the multi-link transmit end and the multi-link receive end after the multi-link transmit end and the multi-link receive end negotiate to set up the TID-to-link mapping relationship.

Further, after determining BSR, the multi-link transmit end needs to send the BSR to the multi-link receive end. That is, the method procedure shown in FIG. 7 further includes S720: The multi-link transmit end sends the BSR to the multi-link receive end.

Specifically, the multi-link transmit end sends the BSR signaling to the multi-link receive end over the one or more links.

In this embodiment of this application, the multi-link transmit end may send the BSR to the multi-link receive end by sending a data packet carrying the BSR to the multi-link receive end, where a MAC header of the data packet carries the BSR. For example, the data packet may be a QoS data packet. The QoS data packet in this embodiment of this application includes a QoS null (Null) data packet.

In a possible implementation, in this embodiment of this application, the multi-link transmit end may actively send the BSR to the multi-link receive end.

For example, when sending a data packet to the multi-link receive end, the multi-link transmit end carries the BSR signaling in a MAC header of the data packet.

In another possible implementation, in this embodiment of this application, the multi-link transmit end may be triggered to send the BSR to the multi-link receive end. In this implementation, the method procedure shown in FIG. 7 further includes S721: The multi-link receive end sends trigger information to the multi-link transmit end, where the trigger information is used for triggering the multi-link transmit end to report the BSR.

In a possible implementation, when receiving a BAR request frame sent by the multi-link receive end, for example, a BAR request frame similar to an 802.11 BSR poll trigger frame, the multi-link transmit end responds with the BSR signaling after a time period of a short interframe space (short interframe space, SIFS).

For example, after the multi-link transmit end receives a trigger frame sent by the multi-link receive end, the multi-link transmit end includes the BSR signaling in a MAC header of a data packet when sending the data packet to the multi-link receive end after preset duration.

In this embodiment of this application, in addition to sending the BSR signaling to the multi-link receive end, the multi-link transmit end further needs to send buffer status indication information to the multi-link transmit end. In other words, the data packet further includes the buffer status indication information. The buffer status indication information indicates a buffer status of the multi-link transmit end.

For example, FIG. 9 is a schematic diagram of a data packet according to an embodiment of this application. Not only a HT-control field carries the BSR signaling, but also a QoS control field further carries buffer status indication information.

Currently, the QoS control field includes: a TID field, an end of service period (end of service period, EOSP) field, an acknowledgment policy (ACK policy) field, an aggregate media access control service data unit (aggregate medium access control service data unit, A-MSDU) present (present) field, a scaling factor field, and a queue size field.

In this embodiment of this application, 1-bit most significant bit in the TID field is reused to indicate, together with an 8-bit queue size field, a buffer size of a service indicated by the TID field.

This application further provides a method for extending a bitmap of a block acknowledgment frame. The following describes the solution in detail.

Before a transmit end sends a data packet, the transmit end and a receive end usually need to set up a block acknowledgment session, and then the transmit end can send aggregation of multiple data packets. When receiving the aggregation of the multiple data packets, the receive end responds with a block acknowledgment (block Ack) or a multi-STA block acknowledgment (multi-STA block Ack).

The block acknowledgment session is completed by exchanging an add block acknowledgment (add block acknowledgment, ADDBA) request frame and an ADDBA response frame between the transmit end and the receive end. Specifically, the transmit end sends the ADDBA request frame, and the receive end responds with an acknowledgment frame Ack. Then, the receive end returns the ADDBA response frame, and the receive end responds with an acknowledgment frame Ack. After the transmit end and the receive end exchange the ADDBA request frame and the ADDBA response frame, the transmit end maintains a transmit window based on content carried in the frames, and the receive end maintains a receive window (or referred to as a scoreboard) and a buffer reordering space based on content carried in the ADDBA request frame and the ADDBA response frame.

The ADDBA request frame and the ADDBA response frame are a type of function management frames, and include content shown in Table 2 and Table 3. For specific meanings of the content included in the ADDBA request frame and the ADDBA response frame, refer to the 802.11-2016 standard protocol. Details are not described in this application.

TABLE 2

| ADDBA request frame | |
|---|---|
| Sequence number | |
| 1 | Category |
| 2 | Block acknowledgment function |

TABLE 2-continued

ADDBA request frame

Sequence number

| | |
|---|---|
| 3 | Dialog token Token number |
| 4 | Block acknowledgment parameter set |
| 5 | Block acknowledgment timeout value |
| 6 | Block acknowledgment starting sequence control |
| 7 | GCR group address element (optional) |
| 8 | Multi-band (optional) |
| 9 | TCLAS (optional) |
| 10 | ADDBA Extension (optional) |

TABLE 3

ADDBA response frame

Sequence number

| | |
|---|---|
| 1 | Category |
| 2 | Block acknowledgment function |
| 3 | Dialog token Token number |
| 4 | Status code Status code |
| 5 | Block acknowledgment parameter set |
| 6 | Block acknowledgment timeout value |
| 7 | GCR group address element (optional) |
| 8 | Multi-band (optional) |
| 9 | TCLAS (optional) |
| 10 | ADDBA Extension (optional) |
| 11 | Originator preferred MCS (optional), Modulation and coding scheme preferred by a transmit end (optional) |

The block acknowledgment parameter set field includes fields such as an aggregate MAC protocol data unit (aggregate MAC protocol data unit, A-MSDU) support field, a block acknowledgment policy field, a service type field, and a buffer size field. FIG. 10 is a schematic diagram of a block acknowledgment parameter set field.

To support a block acknowledgment session of multi-link aggregation, a type related function of a multi-link block acknowledgment session may be added to a block acknowledgment function field. A reserved value in the table 4 below indicates a multi-link block acknowledgment request, a multi-link block acknowledgment response, and multi-link block acknowledgment session teardown.

TABLE 4

Field values of a block acknowledgment function

Acknowledgment function field value

| | |
|---|---|
| 0 | ADDBA request |
| 1 | ADDBA response |
| 2 | BA session deletion |
| 3 to 127 | Reserved |
| 128 | NDP ADDBA request (NDP, Null data packet, null data packet) |
| 129 | NDP ADDBA response |
| 130 | NDP BA session deletion |
| 131 | Reserved |
| 132 | BAT ADDBA request (BAT, block acknowledgment target wake up time, block acknowledgment target wake up time) |
| 133 | BAT ADDBA response |
| 134 | BAT BA session deletion |
| 134 to 255 | Reserved |

To support a bitmap of a 1K or longer block acknowledgment frame, the buffer size field in the block acknowledgment parameter set field shown in FIG. 10 may be extended. FIG. 11 is a schematic diagram of an ADDBA extension element according to an embodiment of this application. It can be seen from FIG. 11 that the ADDBA extension element uses a 10-bit buffer size field in a 1-bit (No-fragmentation (No-fragmentation)), 2-bit (HE fragmentation operation (HE fragmentation operation)), or 5-bit (reserved) joint block acknowledgment parameter set to together indicate a quantity of buffers on a TID indicated by a TID field in the block acknowledgment parameter set. If the transmit end does not support an A-MSDU, a size of each buffered service is equal to a maximum quantity of MSDUs. If the transmit end supports an A-MSDU, a size of each service buffer is equal to a maximum quantity of A-MSDUs. An added bit is a most significant bit, and the 10-bit buffer size field of the block acknowledgment parameter set field is a 10-bit least significant bit. Alternatively, a quantity of added bits may be placed in another element (for example, a newly added element), and the quantity of bits may be another quantity of bits, for example, one byte.

The data transmission method provided in embodiments of this application is described above in detail with reference to FIG. 7 to FIG. 11. Embodiments of this application provide a data transmission apparatus. In a possible implementation, the apparatus is configured to implement the steps or procedures corresponding to the multi-link receive end in the foregoing method embodiment. In another possible implementation, the apparatus is configured to implement the steps or procedures corresponding to the multi-link transmit end in the foregoing method embodiment.

Data transmission apparatuses provided in embodiments of this application are described below in detail with reference to FIG. 12 to FIG. 14.

FIG. 12 is a schematic block diagram of a data transmission apparatus according to an embodiment of this application. As shown in FIG. 12, the apparatus 1200 may include a communication unit 1210 and a processing unit 1220. The communication unit 1210 may communicate with the outside, and the processing unit 1220 is configured to process data. The communication unit 1210 may also be referred to as a communication interface or a transceiver unit.

In a possible design, the apparatus 1200 may implement steps or procedures performed by the multi-link transmit end corresponding to the foregoing method embodiment. The processing unit 1220 is configured to perform processing-related operations performed by the multi-link transmit end in the foregoing method embodiment. The communication unit 1210 is configured to perform receiving/sending-related operations performed by the multi-link transmit end in the foregoing method embodiment.

For example, the processing unit 1220 is configured to determine buffer status report BSR signaling, where the BSR signaling indicates a multi-link receive end to schedule a station of a multi-link transmit end over one or more links.

The communication unit 1210 is configured to send the BSR signaling to the multi-link receive end over the one or more links.

It should be noted that, in a scenario in which the multi-link transmit end is a multi-link STA, the multi-link transmit end may be the multi-link STA shown in FIG. 5. When the multi-link STA sends the BSR signaling over a link #1, the processing unit 1220 may be a processing unit (for example, a processor) in the STA #1 shown in FIG. 5, and the communication unit 1210 may be a communication unit (for example, a transceiver) in the STA #1 shown in FIG. 5. When the multi-link STA separately sends the BSR signaling over the link #1 and a link #2, the processing unit 1220 may be a processing unit in the STA #1 and/or the STA

2 shown in FIG. 5, and the communication unit 1210 may represent communication units in the STA #1 and the STA #2 shown in FIG. 5. Alternatively, the multi-link STA may send the BSR signaling over one or more other links. The processing unit 1220 and the communication unit 1210 may represent a processing unit and a communication unit in one or more other STAs. Details are not described herein again.

Optionally, the communication unit 1210 is further configured to send a request message to the multi-link receive end, and receive a response message from the multi-link receive end, where the request message and the response message are used for negotiating to set up a traffic identifier-to-link TID-to-link mapping relationship.

Optionally, before the communication unit 1210 sends the BSR signaling to the multi-link receive end over the one or more links, the communication unit 1210 is further configured to receive trigger information from the multi-link receive end, where the trigger information is used for triggering the multi-link transmit end to send the BSR signaling over the one or more links.

Optionally, that the communication unit 1210 sends the BSR signaling to the multi-link receive end over the one or more links includes:

The communication unit 1210 sends a quality of service QoS data packet to the multi-link receive end over the one or more links, where a media access control MAC header of the QoS data packet carries the BSR signaling.

For example, the communication unit 1210 may be divided into a receiving unit and a sending unit. The receiving unit is configured to perform receiving-related operations of the multi-link transmit end in the foregoing method embodiment, and the sending unit is configured to perform sending-related operations of the multi-link transmit end in the foregoing method embodiment.

In another possible design, the apparatus 1200 may implement steps or procedures performed by the multi-link receive end in the foregoing method embodiment. The communication unit 1210 is configured to perform receiving/sending-related operations performed by the multi-link receive end in the foregoing method embodiment, and the processing unit 1220 is configured to perform processing-related operations performed by the multi-link receive end in the foregoing method embodiment.

It should be noted that, in a scenario in which the multi-link receive end is a multi-link AP, the multi-link receive end may be the multi-link AP shown in FIG. 5. When the multi-link AP receives the BSR signaling over a link #1, the processing unit 1220 may be a processing unit (for example, a processor) in the AP #1 shown in FIG. 5, and the communication unit 1210 may be a communication unit (for example, a transceiver) in the AP #1 shown in FIG. 5. When the multi-link AP separately receives the BSR signaling over the link #1 and a link #2, the processing unit 1220 may be a processing unit in the AP #1 and/or the AP #2 shown in FIG. 5, and the communication unit 1210 may represent communication units in the AP #1 and the AP #2 shown in FIG. 5. Alternatively, the multi-link AP may receive the BSR signaling over one or more other links. The processing unit 1220 and the communication unit 1210 may represent a processing unit and a communication unit in one or more other APs. Details are not described herein again.

For example, the communication unit 1210 is configured to receive buffer status report BSR signaling from the multi-link transmit end over one or more links.

The processing unit 1220 is configured to schedule a station of the multi-link transmit end over the one or more links based on the BSR signaling.

Optionally, the communication unit 1210 is further configured to receive a request message from the multi-link transmit end, and send a response message to the multi-link transmit end, where the request message and the response message are used for negotiating to set up a traffic identifier-to-link TID-to-link mapping relationship.

Optionally, before the communication unit 1210 receives the BSR signaling from the multi-link transmit end over the one or more links, the communication unit 1210 is further configured to send trigger information to the multi-link transmit end, where the trigger information is used for triggering the multi-link transmit end to send the BSR signaling over the one or more links.

Optionally, that the communication unit 1210 receives BSR signaling from the multi-link transmit end over one or more links includes:

The communication unit 1210 receives a quality of service QoS data packet from the multi-link transmit end over the one or more links, where a media access control MAC header of the QoS data packet carries the BSR signaling.

For example, the communication unit 1210 may be divided into a receiving unit and a sending unit. The receiving unit is configured to perform receiving-related operations of the multi-link receive end in the foregoing method embodiment, and the sending unit is configured to perform sending-related operations of the multi-link receive end in the foregoing method embodiment.

It should be understood that, the apparatus 1200 herein is presented in a form of functional units. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1200 may be specifically the multi-link transmit end in the foregoing embodiments, and may be configured to perform the procedures and/or steps corresponding to the multi-link transmit end in the foregoing method embodiment. Alternatively, the apparatus 1200 may be specifically the multi-link receive end in the foregoing embodiments, and may be configured to perform the procedures and/or steps corresponding to the multi-link receive end in the foregoing method embodiment. To avoid repetition, details are not described herein again.

The apparatus 1200 in each of the foregoing solutions has functions of implementing corresponding steps performed by the multi-link transmit end in the foregoing method. Alternatively, the apparatus 1200 in each of the foregoing solutions has functions of implementing corresponding steps performed by the multi-link receive end in the foregoing method. The function may be implemented by hardware, or may be implemented by hardware executing corresponding software. The hardware or software includes one or more modules corresponding to the foregoing function. For example, a communication unit may be replaced with a transceiver (where for example, a sending unit in the communication unit may be replaced with a transmitter, and a receiving unit in the communication unit may be replaced with a receiver), and another unit such as a processing unit may be replaced with a processor, to separately perform receiving and sending operations and a related processing operation in the method embodiment.

In addition, the communication unit may alternatively be a transceiver circuit (where for example, the transceiver circuit may include a receiver circuit and a transmitter circuit), and the processing unit may be a processing circuit. In this embodiment of this application, the apparatus in FIG. 12 may be the receive end or the transmit end in the foregoing embodiments, or may be a chip or a chip system, for example, a system on chip (system on chip, SoC). The communication unit may be an input/output circuit or a communication interface. The processing unit is a processor, a microprocessor, or an integrated circuit integrated on the chip. This is not limited herein.

FIG. 13 shows a data transmission apparatus 1300 according to an embodiment of this application. The apparatus 1300 includes a processor 1310 and a transceiver 1320. The processor 1310 and the transceiver 1320 communicate with each other through an internal connection path, and the processor 1310 is configured to execute instructions, to control the transceiver 1320 to send a signal and/or receive a signal.

Optionally, the apparatus 1300 may further include a memory 1330. The memory 1330 communicates with the processor 1310 and the transceiver 1320 through an internal connection path. The memory 1330 is configured to store instructions, and the processor 1310 may execute the instructions stored in the memory 1330. In a possible implementation, the apparatus 1300 is configured to implement procedures and steps corresponding to a transmit end in the foregoing method embodiment. In another possible implementation, the apparatus 1300 is configured to implement procedures and steps corresponding to a receive end in the foregoing method embodiment.

It should be understood that the apparatus 1300 may be specifically the transmit end or the receive end in the foregoing embodiments, or may be a chip or a chip system. Correspondingly, the transceiver 1320 may be a transceiver circuit of the chip. This is not limited herein. Specifically, the apparatus 1300 may be configured to perform the steps and/or the procedures corresponding to the transmit end or the receive end in the foregoing method embodiment. Optionally, the memory 1330 may include a read-only memory and a random access memory, and provide instructions and data for the processor. A part of the memory may further include a non-volatile random access memory. For example, the memory may further store information of a device type. The processor 1310 may be configured to execute the instructions stored in the memory. When the processor 1310 executes the instructions stored in the memory, the processor 1310 is configured to perform the steps and/or procedures of the method embodiment corresponding to the transmit end or the receive end.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiment can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor in embodiments of this application may implement or perform the methods, the steps, and the logical block diagrams that are disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

FIG. 14 shows a data transmission apparatus 1400 according to an embodiment of this application. The apparatus 1400 includes a processing circuit 1410 and a transceiver circuit 1420. The processing circuit 1410 and the transceiver circuit 1420 communicate with each other through an internal connection path, and the processing circuit 1410 is configured to execute instructions, to control the transceiver circuit 1420 to send a signal and/or receive a signal.

Optionally, the apparatus 1400 may further include a storage medium 1430. The storage medium 1430 communicates with the processing circuit 1410 and the transceiver circuit 1420 through an internal connection path. The storage medium 1430 is configured to store instructions, and the processing circuit 1410 may execute the instructions stored in the storage medium 1430. In a possible implementation, the apparatus 1400 is configured to implement procedures and steps corresponding to a transmit end in the foregoing method embodiment. In another possible implementation, the apparatus 1400 is configured to implement procedures and steps corresponding to a receive end in the foregoing method embodiment.

According to the method provided in embodiments of this application, this application further provides a computer program product. The computer program product includes computer program code. When the computer program code is run on a computer, the computer is enabled to perform the method in the embodiment shown in FIG. 7.

According to the method provided in embodiments of this application, this application further provides a computer-readable medium. The computer-readable medium stores program code. When the program code is run on a computer, the computer is enabled to perform the method in the embodiment shown in FIG. 7.

According to the method provided in embodiments of this application, this application further provides a system. The system includes the foregoing multi-link transmit end and the foregoing multi-link receive end.

According to the method provided in embodiments of this application, this application further provides a system. The system includes one or more stations and one or more access points, and the stations and the access points are multi-link stations and multi-link access points.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
sending, by a multi-link transmit end, a request message to a multi-link receive end; and
receiving, by the multi-link transmit end, a response message from the multi-link receive end, wherein:
the request message and the response message are used for negotiation to set up a traffic identifier-to-link (TID-to-link) mapping relationship; and
wherein the request message comprises mapping information, the mapping information comprises a TID bitmap field and N link identifier bitmap fields, N is a positive integer, wherein a bit whose value is 1 in the TID bitmap field indicates that a TID identified by a position of the bit whose value is 1 in the TID bitmap field corresponds to one of the N link identifier bitmap fields, a bit whose value is 1 in a link identifier bitmap field indicates that a TID corresponding to the link identifier bitmap field is mapping to a link identified by a position of the bit whose value is 1 in the link identifier bitmap field.

2. The method according to claim 1, wherein a length of each of the link identifier bitmap fields is fixed.

3. The method according to claim 1, wherein a quantity of bits that are set to 1 in the TID bitmap field is N.

4. The method according to claim 1, wherein the response message comprises control information, and the control information indicates that a TID-to-Link mapping is accepted.

5. The method according to claim 1, wherein the response message comprises control information, and the control information indicates that a TID-to-Link mapping is rejected.

6. The method according to claim 1, wherein the response message comprises control information, and the control information indicates that a TID-to-Link mapping is suggested.

7. A data transmission apparatus, comprising:
at least one processor; and
at least one memory, storing computer instructions, which when execute by the at least one processor, cause the data transmission apparatus to:
send a request message to a multi-link receive end; and
receive a response message from the multi-link receive end,
wherein the request message and the response message are used for negotiation to set up a traffic identifier-to-link (TID-to-link) mapping relationship; and
wherein the request message comprises mapping information, the mapping information comprises a TID bitmap field and N link identifier bitmap fields, N is a positive integer, wherein a bit whose value is 1 in the TID bitmap field indicates that a TID identified by a position of the bit whose value is 1 in the TID bitmap field corresponds to one of the N link identifier bitmap fields, a bit whose value is 1 in a link identifier bitmap field indicates that a TID corresponding to the link identifier bitmap field is mapping to a link identified by a position of the bit whose value is 1 in the link identifier bitmap field.

8. The data transmission apparatus according to claim 7, wherein a length of each of the link identifier bitmap fields is fixed.

9. The data transmission apparatus according to claim 7, wherein a quantity of bits that are set to 1 in the TID bitmap field is N.

10. The data transmission apparatus according to claim 7, wherein the response message comprises control information, and the control information indicates that a TID-to-Link mapping is accepted.

11. The data transmission apparatus according to claim 7, wherein the response message comprises control information, and the control information indicates that a TID-to-Link mapping is rejected.

12. The data transmission apparatus according to claim 7, wherein the response message comprises control information, and the control information indicates that a TID-to-Link mapping is suggested.

13. A non-transitory computer-readable storage medium, comprising computer instructions, which when executed by at least one processor, cause a data transmission apparatus comprising the at least one processor to:
send a request message to a multi-link receive end; and
receive a response message from the multi-link receive end,
wherein the request message and the response message are used for negotiation to set up a traffic identifier-to-link (TID-to-link) mapping relationship; and
wherein the request message comprises mapping information, the mapping information comprises a TID bitmap field and N link identifier bitmap fields, N is a positive integer, wherein a bit whose value is 1 in the TID bitmap field indicates that a TID identified by a position of the bit whose value is 1 in the TID bitmap field corresponds to one of the N link identifier bitmap fields, a bit whose value is 1 in a link identifier bitmap field indicates that a TID corresponding to the link identifier bitmap field is mapping to a link identified by a position of the bit whose value is 1 in the link identifier bitmap field.

14. The non-transitory computer-readable storage medium according to claim 13, wherein a length of each of the link identifier bitmap fields is fixed.

15. The non-transitory computer-readable storage medium according to claim 13, wherein a quantity of bits that are set to 1 in the TID bitmap field is N.

16. The non-transitory computer-readable storage medium according to claim 13, wherein the response message comprises control information, and the control information indicates that a TID-to-Link mapping is accepted.

17. The non-transitory computer-readable storage medium according to claim 13, wherein the response message comprises control information, and the control information indicates that a TID-to-Link mapping is rejected.

18. The non-transitory computer-readable storage medium according to claim 13, wherein the response message comprises control information, and the control information indicates that a TID-to-Link mapping is suggested.

* * * * *